(12) United States Patent
Rhee et al.

(10) Patent No.: US 11,284,251 B2
(45) Date of Patent: Mar. 22, 2022

(54) MOBILE DEVICE AND CONTROL METHOD THEREOF

(71) Applicant: SAMSUNG ELECTRONICS CO., LTD., Suwon-si (KR)

(72) Inventors: Young-Ho Rhee, Yongin-si (KR); Jae-hwan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 399 days.

(21) Appl. No.: 14/100,449

(22) Filed: Dec. 9, 2013

(65) Prior Publication Data

US 2014/0101737 A1 Apr. 10, 2014

Related U.S. Application Data

(63) Continuation-in-part of application No. 13/915,173, filed on Jun. 11, 2013, now Pat. No. 9,483,758.
(Continued)

(30) Foreign Application Priority Data

Jan. 7, 2013 (KR) .................. 10-2013-0001779

(51) Int. Cl.
*H04W 12/06* (2021.01)
*H04L 29/06* (2006.01)
(Continued)

(52) U.S. Cl.
CPC ............ *H04W 12/06* (2013.01); *G06F 21/32* (2013.01); *G06F 21/36* (2013.01); *G06Q 20/322* (2013.01);
(Continued)

(58) Field of Classification Search
CPC ............ H04W 12/06; G06Q 20/40145; G06Q 20/3674; G06Q 20/322; G06F 21/36; G06F 21/32; H04L 63/0861
(Continued)

(56) References Cited

U.S. PATENT DOCUMENTS

| 5,483,472 A | 1/1996 | Overman |
| 5,821,513 A | 10/1998 | O'Hagan et al. |

(Continued)

FOREIGN PATENT DOCUMENTS

| CN | 1354864 A | 6/2002 |
| CN | 1797270 A | 7/2006 |

(Continued)

OTHER PUBLICATIONS

"Biometric Phone: Pantech GI100", downloaded from https://gizmodo.com/026663/biometric-phone-pantech-gi100 and attached as PDF file, (Year: 2011).*

(Continued)

*Primary Examiner* — James D Nigh
*Assistant Examiner* — Margaret M Neubig
(74) *Attorney, Agent, or Firm* — Sughrue Mion, PLLC

(57) ABSTRACT

A mobile device and a method are provided. A mobile device includes a display, a sensor configured to sense a user operation with respect to the display, a fingerprint sensor configured to sense a fingerprint of the user that input the user operation, a storage configured to store preregistered fingerprint information, and a controller configured to perform an operation corresponding to the user operation when the fingerprint sensed by the fingerprint sensor matches the stored fingerprint information and perform a fingerprint registration operation when the fingerprint sensed by the fingerprint sensor does not match the stored fingerprint information.

18 Claims, 36 Drawing Sheets

Related U.S. Application Data

(60) Provisional application No. 61/658,156, filed on Jun. 11, 2012.

(51) Int. Cl.
*G06Q 20/40* (2012.01)
*G06Q 20/36* (2012.01)
*G06Q 20/32* (2012.01)
*G06F 21/36* (2013.01)
*G06F 21/32* (2013.01)

(52) U.S. Cl.
CPC ... *G06Q 20/3674* (2013.01); *G06Q 20/40145* (2013.01); *H04L 63/0861* (2013.01)

(58) Field of Classification Search
USPC ............................................... 705/50–79
See application file for complete search history.

(56) References Cited

U.S. PATENT DOCUMENTS

| | | | |
|---|---|---|---|
| 6,000,610 A | 12/1999 | Talbott et al. | |
| 6,128,415 A | 10/2000 | Hultgren, III et al. | |
| 6,307,576 B1 | 10/2001 | Rosenfeld | |
| 6,421,453 B1 | 7/2002 | Kanevsky et al. | |
| 7,023,979 B1 | 4/2006 | Wu et al. | |
| 7,593,000 B1 | 9/2009 | Chin | |
| 8,369,887 B2 | 2/2013 | Choe et al. | |
| 8,627,379 B2 | 1/2014 | Kokenos et al. | |
| 8,745,490 B2* | 6/2014 | Kim | G06F 21/40 715/702 |
| 8,773,376 B2 | 7/2014 | Batara | |
| 8,799,897 B2 | 8/2014 | Katiyar et al. | |
| 8,810,367 B2* | 8/2014 | Mullins | G06K 9/228 340/5.83 |
| 8,856,039 B1 | 10/2014 | Talreja et al. | |
| 9,317,835 B2 | 4/2016 | Calman et al. | |
| 9,483,758 B2 | 11/2016 | Rhee et al. | |
| 9,575,615 B1 | 2/2017 | Nicholls et al. | |
| 9,589,296 B1 | 3/2017 | Li et al. | |
| 9,665,837 B2 | 5/2017 | Garrison et al. | |
| 9,826,077 B2 | 11/2017 | Shim et al. | |
| 10,002,337 B2 | 6/2018 | Siddique et al. | |
| 2002/0161717 A1 | 10/2002 | Kassan et al. | |
| 2003/0004831 A1 | 1/2003 | Owens | |
| 2003/0051138 A1* | 3/2003 | Maeda | G06Q 20/04 713/168 |
| 2003/0158796 A1 | 8/2003 | Balent | |
| 2005/0060554 A1* | 3/2005 | O'Donoghue | G06Q 20/4014 713/183 |
| 2005/0203765 A1* | 9/2005 | Maritzen | G06Q 20/10 705/26.1 |
| 2005/0270140 A1* | 12/2005 | Oh | G06K 9/6255 340/5.83 |
| 2006/0139336 A1 | 6/2006 | Mattingley-Scott et al. | |
| 2006/0215753 A1 | 9/2006 | Lee et al. | |
| 2007/0150369 A1 | 6/2007 | Zivin | |
| 2007/0177804 A1 | 8/2007 | Elias et al. | |
| 2008/0010215 A1 | 1/2008 | Rackley, III et al. | |
| 2008/0167977 A1 | 7/2008 | Auvenshine et al. | |
| 2008/0228600 A1 | 9/2008 | Treyz et al. | |
| 2008/0320107 A1 | 12/2008 | Park | |
| 2009/0085877 A1 | 4/2009 | Chang et al. | |
| 2009/0192913 A1 | 7/2009 | Saito et al. | |
| 2009/0299834 A1 | 12/2009 | Wilson | |
| 2009/0313101 A1 | 12/2009 | McKenna et al. | |
| 2010/0004033 A1 | 1/2010 | Choe et al. | |
| 2010/0036698 A1 | 2/2010 | Garrison et al. | |
| 2010/0076890 A1 | 3/2010 | Low et al. | |
| 2010/0125495 A1 | 5/2010 | Smith et al. | |
| 2010/0191578 A1 | 7/2010 | Tran et al. | |
| 2010/0225607 A1* | 9/2010 | Kim | G06F 3/042 345/173 |
| 2010/0257447 A1 | 10/2010 | Kim et al. | |
| 2010/0265204 A1* | 10/2010 | Tsuda | H04M 1/67 345/174 |
| 2010/0280918 A1 | 11/2010 | Balent | |
| 2010/0306718 A1 | 12/2010 | Shim et al. | |
| 2011/0016150 A1 | 1/2011 | Engstrom et al. | |
| 2011/0077997 A1 | 3/2011 | Agarwala et al. | |
| 2011/0078695 A1 | 3/2011 | Agarwala et al. | |
| 2011/0082735 A1 | 4/2011 | Kannan et al. | |
| 2011/0106581 A1 | 5/2011 | Rohrbasser et al. | |
| 2011/0130170 A1 | 6/2011 | Han et al. | |
| 2011/0145051 A1 | 6/2011 | Paradise et al. | |
| 2011/0196724 A1 | 8/2011 | Fenton et al. | |
| 2011/0218845 A1 | 9/2011 | Medina | |
| 2011/0251954 A1 | 10/2011 | Chin | |
| 2011/0261000 A1 | 10/2011 | Batara | |
| 2011/0282785 A1 | 11/2011 | Chin | |
| 2012/0062688 A1 | 3/2012 | Shen et al. | |
| 2012/0077470 A1 | 3/2012 | Kim et al. | |
| 2012/0102145 A1 | 4/2012 | Jung et al. | |
| 2012/0127179 A1* | 5/2012 | Aspelin | G06T 11/00 345/441 |
| 2012/0150598 A1 | 6/2012 | Griggs | |
| 2012/0196573 A1 | 8/2012 | Sugiyama | |
| 2012/0197743 A1* | 8/2012 | Grigg | G06Q 20/32 705/16 |
| 2012/0233003 A1 | 9/2012 | Calman et al. | |
| 2012/0233015 A1 | 9/2012 | Calman et al. | |
| 2012/0260248 A1 | 10/2012 | Katiyar et al. | |
| 2012/0296770 A1 | 11/2012 | Lin et al. | |
| 2012/0311476 A1 | 12/2012 | Campbell | |
| 2013/0006803 A1 | 1/2013 | Oskolkov et al. | |
| 2013/0080289 A1 | 3/2013 | Roy et al. | |
| 2013/0125069 A1 | 5/2013 | Bourdev et al. | |
| 2013/0311335 A1 | 11/2013 | Howard et al. | |
| 2013/0311768 A1 | 11/2013 | Fosmark et al. | |
| 2013/0332354 A1 | 12/2013 | Rhee et al. | |
| 2015/0106245 A1 | 4/2015 | Mirajkar et al. | |
| 2017/0039548 A1 | 2/2017 | Rhee et al. | |

FOREIGN PATENT DOCUMENTS

| | | |
|---|---|---|
| CN | 101196791 A | 6/2008 |
| CN | 102348013 A | 2/2012 |
| EP | 1 798 867 A2 | 6/2007 |
| EP | 2410482 A1 | 1/2012 |
| JP | 2001-266010 A | 9/2001 |
| JP | 2005-57501 A | 3/2005 |
| JP | 2009-181224 A | 8/2009 |
| JP | 2010-39619 A | 2/2010 |
| JP | 2010-198597 A | 9/2010 |
| JP | 2011/210171 A | 10/2011 |
| JP | 2012-43300 A | 3/2012 |
| JP | 2012-507229 A | 3/2012 |
| JP | 2012-508930 A | 4/2012 |
| JP | 6695616 B2 | 5/2020 |
| KR | 10-2002-0005418 A | 1/2002 |
| KR | 10-2010-0003587 A | 1/2010 |
| KR | 10-2010-0110568 A | 10/2010 |
| KR | 10-2010-0127525 A | 12/2010 |
| KR | 10-2011-0016107 A | 2/2011 |
| KR | 10-2011-0025752 A | 3/2011 |
| KR | 10-2011-0049765 A | 5/2011 |
| KR | 10-2011-0103598 A | 9/2011 |
| KR | 10-2011-0139570 A | 12/2011 |
| KR | 10-2012-0043253 A | 5/2012 |
| WO | 00/72241 A1 | 11/2000 |
| WO | 2010/114251 A2 | 10/2010 |
| WO | 2011/043422 A1 | 4/2011 |

OTHER PUBLICATIONS

Microsoft Computer Dictionary, Fifth Edition, 2002, definition of 'menu' (Year: 2002).*

• "Security of Proximity Mobile Payments", downloaded from https://www.securetechalliance.org/resources/pdf/Security_of_Proximity_Mobile_Payments.pdf and attached as PDF file, dated May 2009. (Year: 2009).*

(56) References Cited

OTHER PUBLICATIONS

Microsoft Computer Dictionary, Fifth Edition, 2002, definition of 'menu', provided in text of action. (Year: 2002) (Year: 2002).*
"Biometric Phone: Pantech GI100", downloaded from https://gizmodo.com/026663/biometric-phone-pantech-gi100 and attached as PDF file in previous action (Year: 2011).*
"Security of Proximity Mobile Payments", downloaded from https://www.securetechalliance.org/resources/pdf/Security_of_Proximity_Mobile_Payments.pdf and attached previously as PDF file, dated May 2009. (Year: 2009).*
Smith, "Smart Agent based Mobile Shopping and Secured Payment", dated Oct. 2012, downloaded from https://ijettcs.org/vol.1Issue3/IJETTCS-2012-09-04-006.pdf and attached as PDF file (Year: 2012).*
International Search Report dated Oct. 16, 2013 issued by the International Searching Authority in counterpart Application No. PCT/KR2013/005127 (PCT/ISA/210).
Written Opinion dated Oct. 16, 2013 issued by the International Searching Authority in counterpart Application No. PCT/KR2013/005127 (PCT/ISA/237).
Communication dated Jan. 8, 2014 issued by the European Patent Office in counterpart European Patent Application No. 13171291.1.
Communication dated Oct. 23, 2014 issued by United States Patent Office in counterpart U.S. Appl. No. 13/915,173.
Communication dated Dec. 22, 2015 issued by the European Patent Office in counterpart European Patent Application No. 13804676.8.
Notice of Allowance dated Sep. 14, 2015 by the United States Patent and Trademark Office in related U.S. Appl. No. 13/915,173.
Final Office Action dated Oct. 8, 2015 by the United States Patent and Trademark Office in related U.S. Appl. No. 13/915,091.
Anonymous, "Sagem Wireless and Upek Partner to Bring Fingerprint-Based Identity Capabilities to New Mobile Devices", Business Wire, Feb. 3, 2010, retrieved from <http://www.sec.gov/Archives/edgar/data/1138830/000119312510020600/d425.htm>.
Communication dated Mar. 13, 2015, issued by the United States Patent and Trademark Office in counterpart U.S. Appl. No. 13/915,091.
Communication dated May 13, 2016, issued by the European Patent Office in counterpart European Application No. 13804676.8.
Office Action dated Jul. 1, 2016 by the United States Patent and Trademark Office in related U.S. Appl. No. 13/915,091.
Communication dated Apr. 1, 2017 issued by the State Intellectual Property Office of P.R. China in counterpart Chinese Patent Application No. 201310233994.7.
Communication dated Sep. 30, 2017, issued the State Intellectual Property Office of P.R. China in counterpart Chinese Application No. 201310233994.7.
Communication dated Nov. 6, 2017, issued by the State Intellectual Property Office of P.R. China in counterpart Chinese Application No. 201380030910.8.
Office Action dated Oct. 2, 2017, issued by the United States Patent and Trademark Office in counterpart U.S. Appl. No. 13/915,091.
Communication dated Jul. 10, 2017 by the Japanese Patent Office in counterpart Japanese Patent Application No. 2013-122763.
Communication dated Mar. 26, 2018, issued by the United States Patent and Trademark Office in counterpart U.S. Appl. No. 13/915,091.
Communication dated Apr. 2, 2018, issued by the Japanese Patent Office in counterpart Japanese Application No. 2013-122763.
Communication dated Apr. 24, 2018, issued by the State Intellectual Property Office of P.R. China in counterpart Chinese Application No. 201380030910.8.
Communication dated Jan. 6, 2017 issued by the United States Patent and Trademark Office in counterpart U.S. Appl. No. 13/915,091.
Communication dated Mar. 20, 2017 issued by the State Intellectual Property Office of P.R. China in counterpart Chinese Patent Application No. 201380030910.8.
Communication dated Nov. 12, 2018 issued by the Japanese Intellectual Property Office in counterpart Japanese Application No. 2013-122763.
Communication dated Nov. 30, 2018 issued by the State Intellectual Property Office of P.R. China in counterpart Chinese Application No. 201380030910.8.
Communication dated Jan. 3, 2019 issued by the European Intellectual Property Office in counterpart European Application No. 13 804 676.8.
Office Action dated Feb. 22, 2019 by the Korean Intellectual Property Office in counterpart Korean Patent Application No. 10-2013-001779.
Office Action dated Mar. 18, 2019 by the Korean Intellectual Property Office in counterpart Korean Patent Application No. 10-2013-001797.
Communication dated Jul. 12, 2018, issued by the European Patent Office in counterpart European Application No. 18168614.8.
English translation of communication dated Jun. 10, 2019 issued by the Japanese Intellectual Property Office in counterpart Japanese Application No. 2013-122763.
Communication dated Aug. 29, 2019 by the Korean Intellectual Property Office in counterpart Korean Patent Application No. 10-2013-0001779.
Communication dated Sep. 25, 2019 by the United States Patent and Trademark Office in counterpart U.S. Appl. No. 16/399,196.
Communication dated Jun. 10, 2019 issued by the Japanese Intellectual Property Office in counterpart Japanese Application No. 2013-122763..
Communication dated Nov. 13, 2019 by the European Patent Office in counterpart European Patent Application No. 19190709.6.
Communication dated Jun. 8, 2020, from the Japanese Patent Office in counterpart application No. 2019-045256.
Communication dated Apr. 2, 2020, issued by the USPTO in counterpart U.S. Appl. No. 16/399,196.
Communication dated Jul. 31, 2020, issued by the Korean Intellectual Property Office in corresponding Korean Application No. 10-2020-0090695.
Communication dated Aug. 25, 2020, issued by the USPTO in counterpart U.S. Appl. No. 16/399,196.
Communication dated Dec. 30, 2020, issued by the United States Patent and Trademark Office in counterpart U.S. Appl. No. 16/399,196.
Communication dated Feb. 25, 2021, issued by the Korean Intellectual Property Office in Korean Patent Application No. 10-2020-0090695.
Communication dated Apr. 9, 2021, from the European Patent Office in European Application No. 13804676.8.
Communication dated Mar. 26, 2021, from the European Patent Office in European Application No. 19190709.6.
Communication dated Sep. 1, 2021, issued by the State Intellectual Property Office of P.R. China in English counterpart Chinese Application No. 201811587527.3.

* cited by examiner

MOBILE DEVICE AND CONTROL METHOD THEREOF

CROSS-REFERENCE TO RELATED APPLICATION

This application is a Continuation In Part of U.S. patent application Ser. No. 13/915,173, filed on Jun. 11, 2013, in the United States Patent and Trademark Office, which is incorporated herein by reference in its entirety and which claims priority from U.S. Provisional Patent Application No. 61/658,156, filed on Jun. 11, 2012, in the United States Patent and Trademark Office, also incorporated herein by reference in its entirety. The application also claims priority from Korean Patent Application No. 10-2013-0001779, filed on Jan. 7, 2013, in the Korean Intellectual Property Office, the disclosure of which is incorporated herein by reference in its entirety.

BACKGROUND

1. Field

Apparatuses and methods consistent with exemplary embodiments relate to a mobile device and a control method thereof, and more particularly, to a mobile device capable of controlling an operation thereof according to a user's gesture and a control method thereof.

2. Description of the Related Art

With development of electronic technology, various types of user terminal apparatuses have been used. In particular, recently, spread of high-spec user terminal apparatuses such as smart phones or tablet personal computers (PCs) are greatly increased.

Thus, a type of serve supported by the user terminal apparatuses gradually highly qualified. In particular, the users tend to prefer faster, more convenient, and simpler service as compared in the past. By considering these circumstances, research on services providable from the user terminal apparatuses have consistently progressed in various ways.

There is shopping service among the services. That is, in the past, the users purchase goods off-line only using cash or a credit card. In recent years, the users shop using a method of ordering goods in on-line shopping malls and paying a transaction amount by credit card, mobile phone authorization, deposit without a bankbook, and the like, using a users' own PCs.

However, it is cumbersome in the shopping service in that the user always has to use the credit for a payment. That is, the current user terminal apparatuses support shopping services in the limited level.

Therefore, there is a need for technology capable of providing the shopping services in the users-portable mobile devices.

However, to execute applications required to perform the payment in the mobile devices, it is inconvenient to perform operations several times. Therefore, it is difficult to enable the shopping using the mobile devices.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments are to provide a mobile device capable of conveniently simply providing shopping service according to a user's operation and a control method thereof.

One or more exemplary embodiment is to provide a mobile device capable of registering various functions based on fingerprints of the user.

According to an aspect of an exemplary embodiment, there is provided a mobile device. The mobile device may include: a display; a sensor configured to sense user' touch with respect to a surface of the display; a fingerprint sensor configured to sense a fingerprint of the user that input the user operation, a storage configured to store preregistered fingerprint information; a controller configured to perform an operation corresponding to the user operation when the sensed fingerprint matches the stored fingerprint information and perform a fingerprint registration operation when the fingerprint sensed by the fingerprint sensor does not match the stored fingerprint information.

In other exemplary embodiments, the storage may further be configured to store function information matched with a plurality of fingerprint information registered for respective fingers of the user. The controller may be configured to perform the operation which corresponds to function information matched with the matched fingerprint information when the sensed fingerprint matches one of the plurality of fingerprint information.

In an exemplary embodiment, when the fingerprint does not match the fingerprint information, the controller may be configured to control the display to display a hand-shaped guide image on the display and to display a guide message guiding the user to input the fingerprint of a respective finger displayed in the guide image, and when the fingerprint of the respective finger is sensed by the fingerprint sensor, the controller may match and store the sensed fingerprint with the user in the storage.

In an exemplary embodiment, the sensor may be configured to sense the user operation including touching a surface of the display in a disabled state of the display.

In an exemplary embodiment, when the user operation matches a preset gesture and the sensed fingerprint matches the fingerprint information, the controller may be configured to activate the display, execute a wallet application, and display an execution screen thereof.

In an exemplary embodiment, when the fingerprint does not match the fingerprint information, the controller may be configured to perform a user authorization process, and when the user authorization process is successful, the controller may be configured to perform the fingerprint registration operation.

According to another aspect of an exemplary embodiment, a method of controlling a mobile device includes sensing a user operation with respect to a display of the mobile device, sensing a fingerprint of the user that input the user operation, performing an operation corresponding to the user operation when the sensed fingerprint matches a preregistered fingerprint information, and performing a fingerprint registration operation when the sensed fingerprint does not match the preregistered fingerprint information.

According to an exemplary embodiment, the method may further include registering a plurality of fingerprint information for respective fingers of the user and storing function information matched with each of the plurality of fingerprint information. The performing the operation corresponding to the user operation may include performing an operation corresponding to function information matched with the fingerprint information of a finger which performed the user operation.

According to an exemplary embodiment, the performing the fingerprint registration operation may include displaying a hand-shaped guide image on the display and a guide message guiding the user to input a fingerprint of a respective finger shown on the guide image, when the sensed fingerprint does not match the fingerprint information and matching and storing the sensed fingerprint with the function information when the function information to be matched with the respective, sensed fingerprint is selected.

According to an exemplary embodiment, the user operation may be sensed in a disabled state of the display.

According to an exemplary embodiment, the performing the operation corresponding to the user operation may include activating the display, executing a wallet application, and displaying an execution screen of the wallet application, when the user operation matches a preset gesture and the sensed fingerprint matches the fingerprint information.

According to an exemplary embodiment, the performing the fingerprint registration operation may include performing a user authorization process when the sensed fingerprint does not match the fingerprint information and performing the fingerprint registration operation when the authorization process succeeds.

In an exemplary embodiment, the controller may activate the display and execute the wallet application when the user' touch operation matched with the gesture information and a user's fingerprint matched with pre-registered fingerprint information are sensed.

In an exemplary embodiment, the disabled state of the display unit may be a state in which the display unit is off or a locked screen is displayed.

The user's touch operation may be a gesture in which a plurality of points are touched on the surface of the display unit and move to increase a distance therebetween.

According to the above-described exemplary embodiments, shopping services using mobile devices may be simply and conveniently performed. Also, according to the above-described exemplary embodiments, various operations may be registered to correspond to user's fingerprints.

Additional aspects of the exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which.

Figure 21:
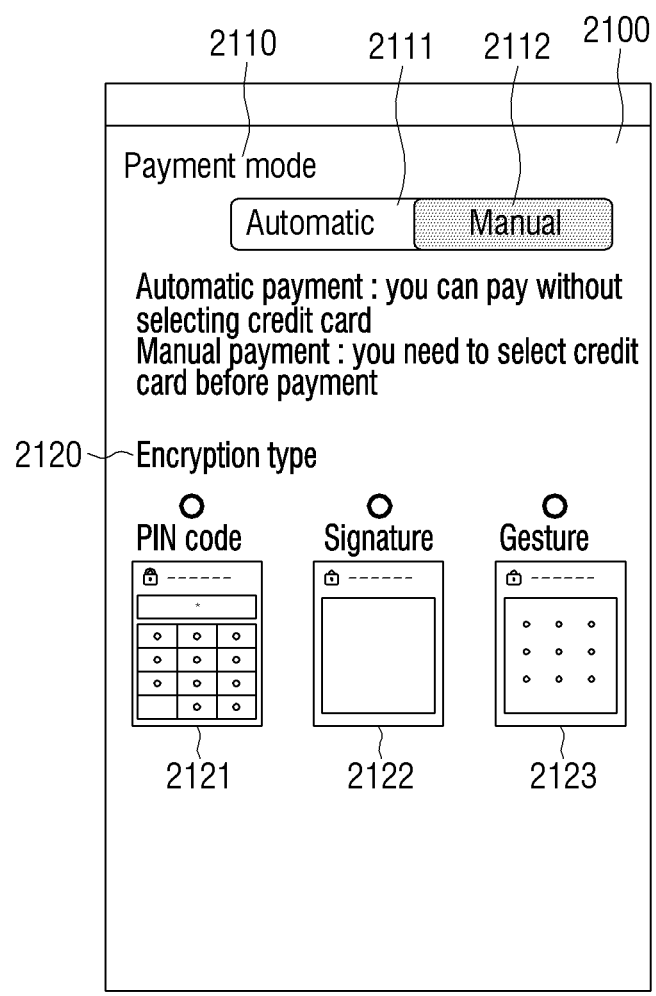
Figure 22:
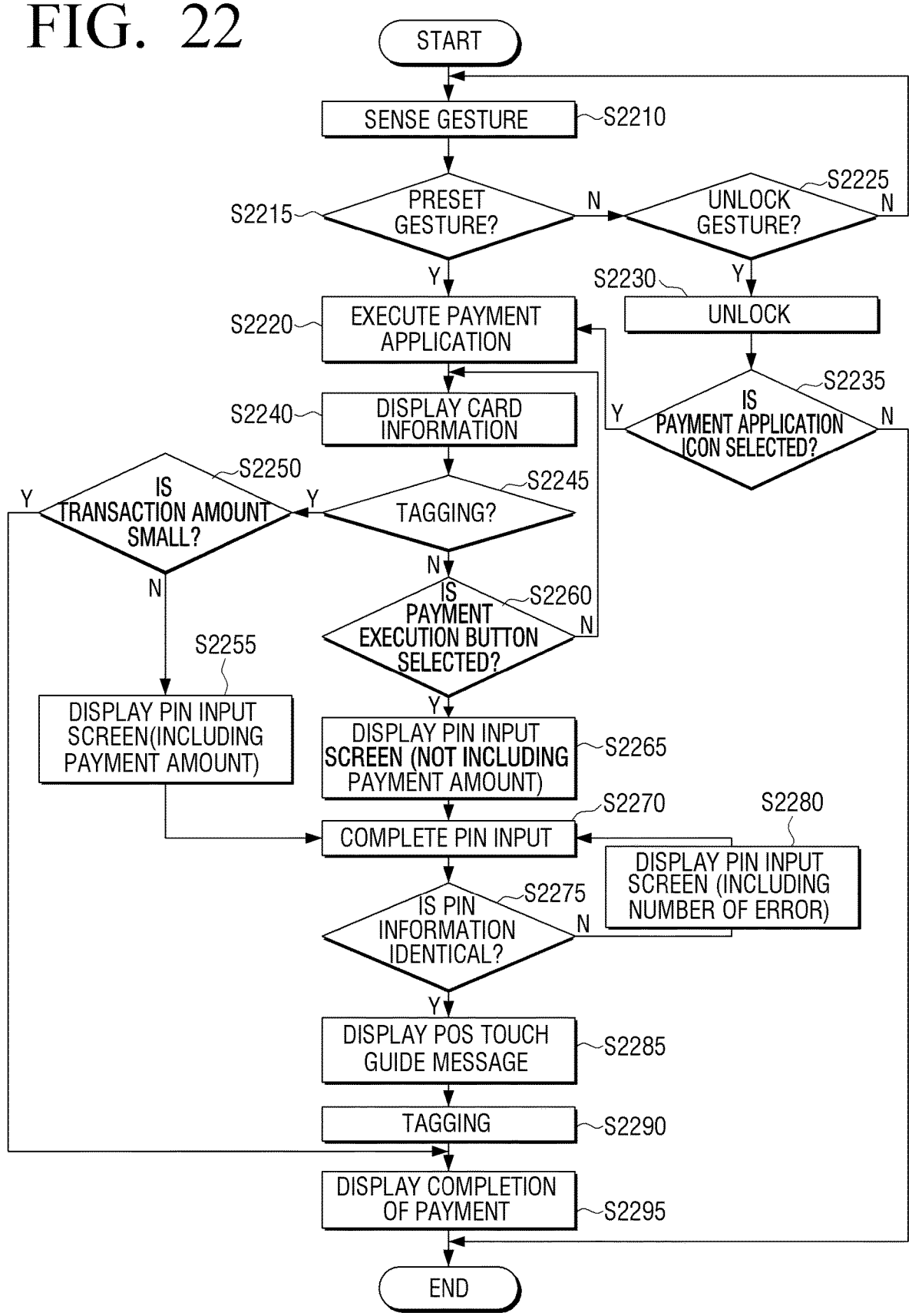
Figure 23:
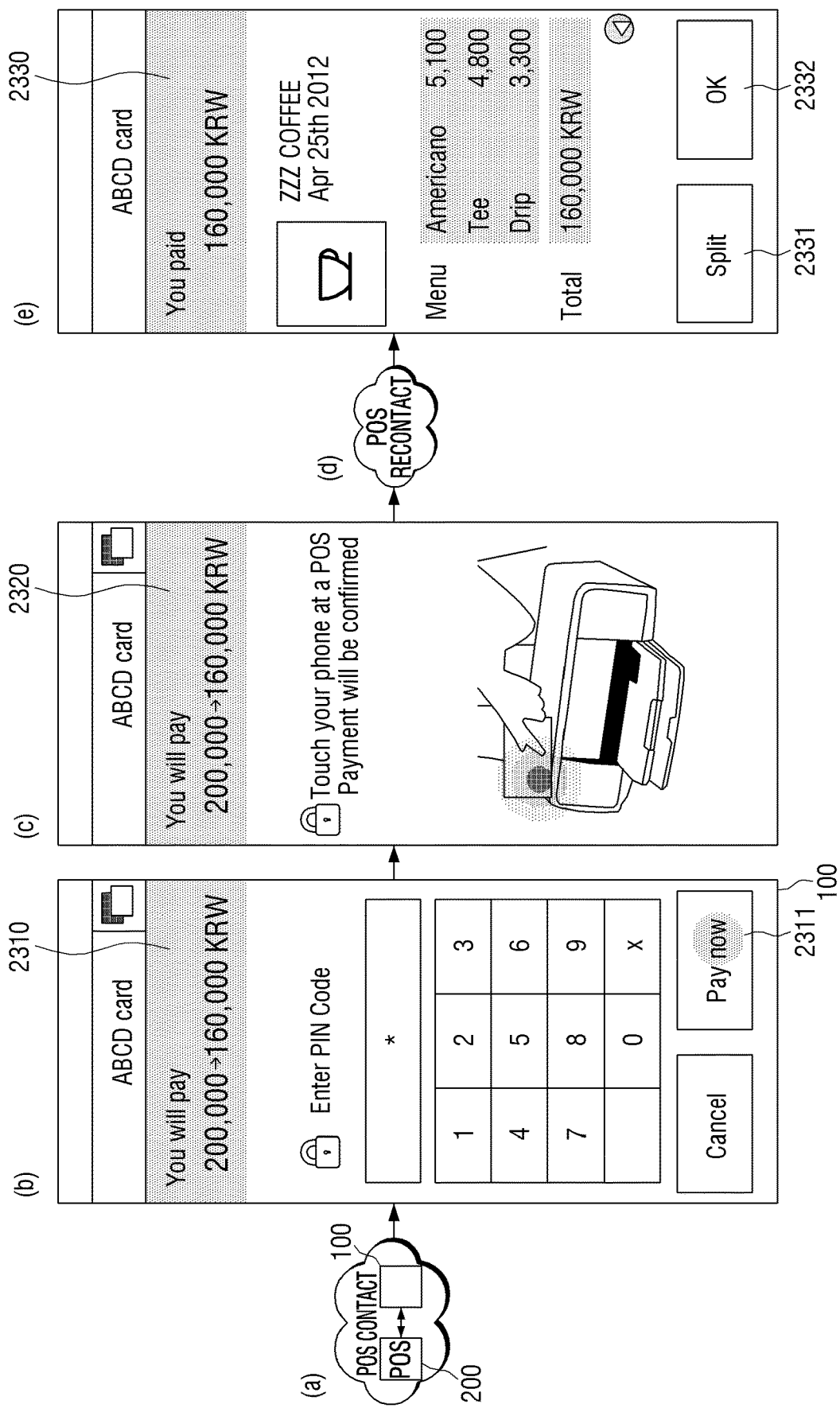
Figure 24:
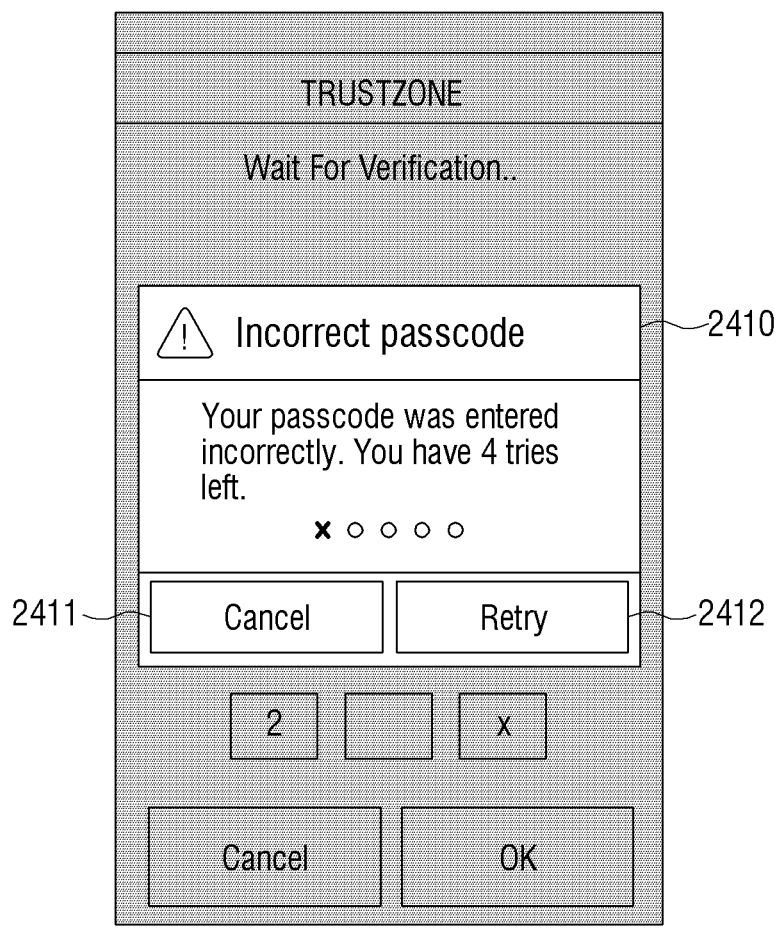
Figure 25:
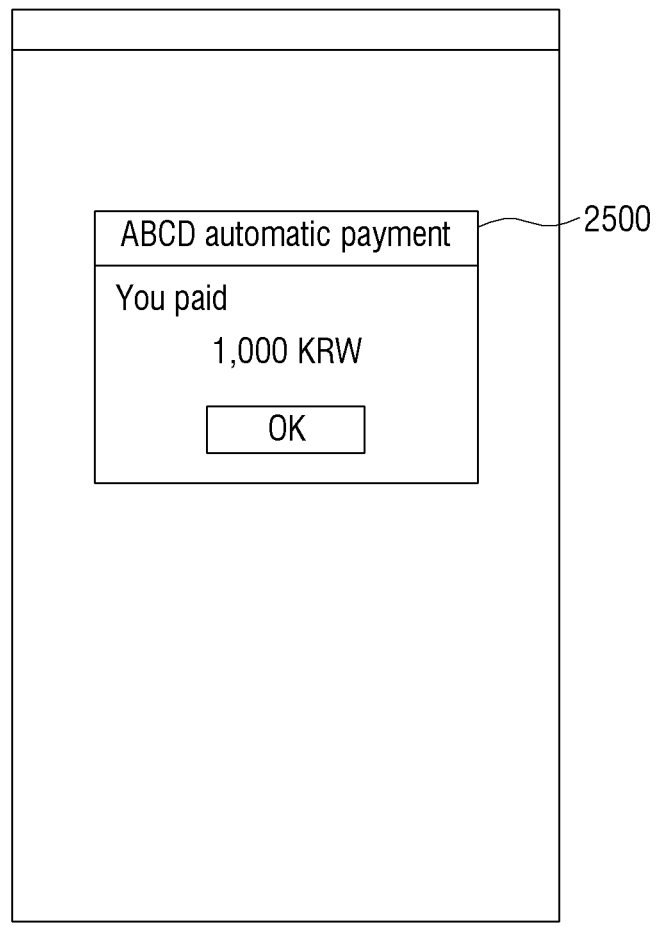
Figure 26:
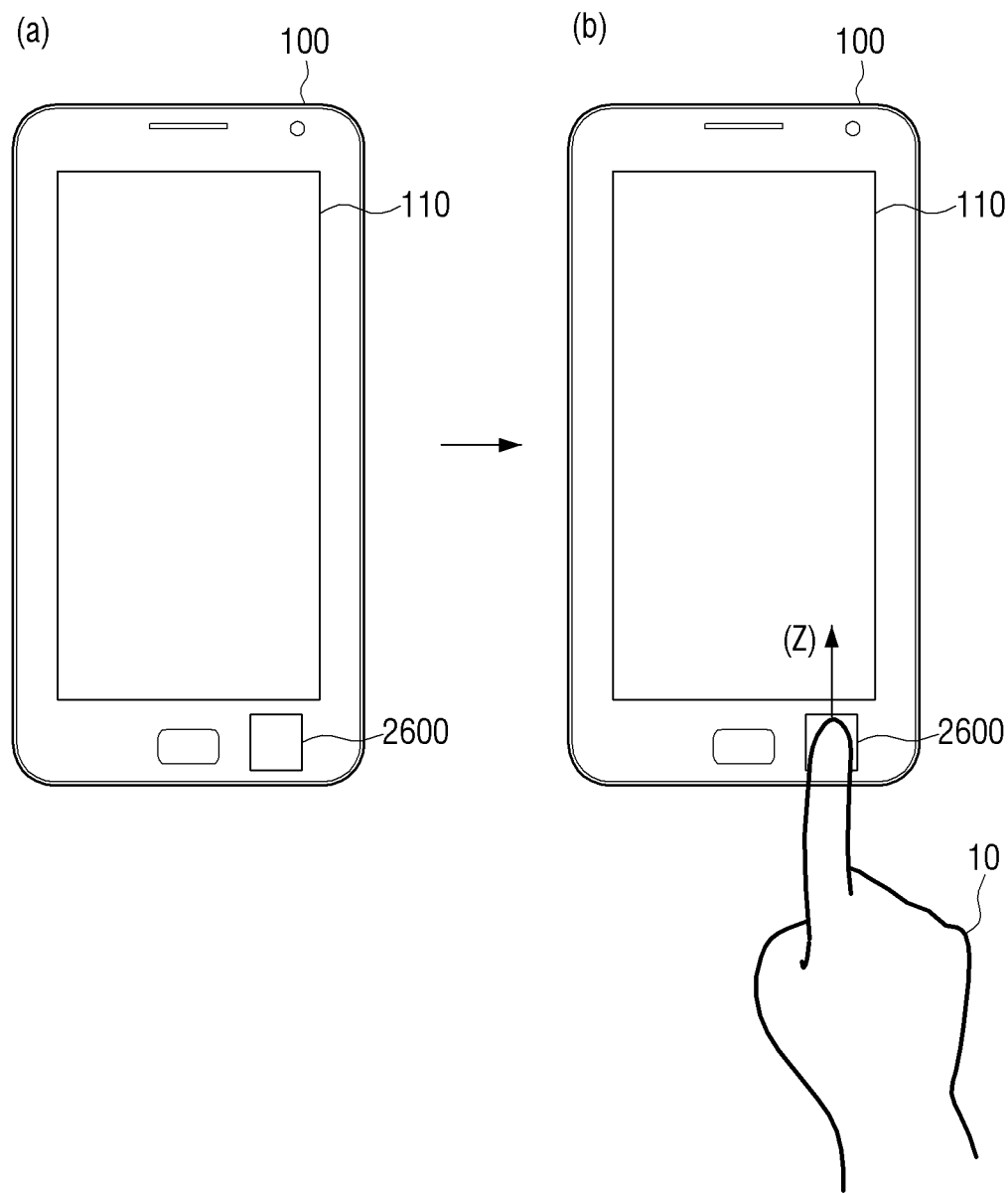
Figure 27:
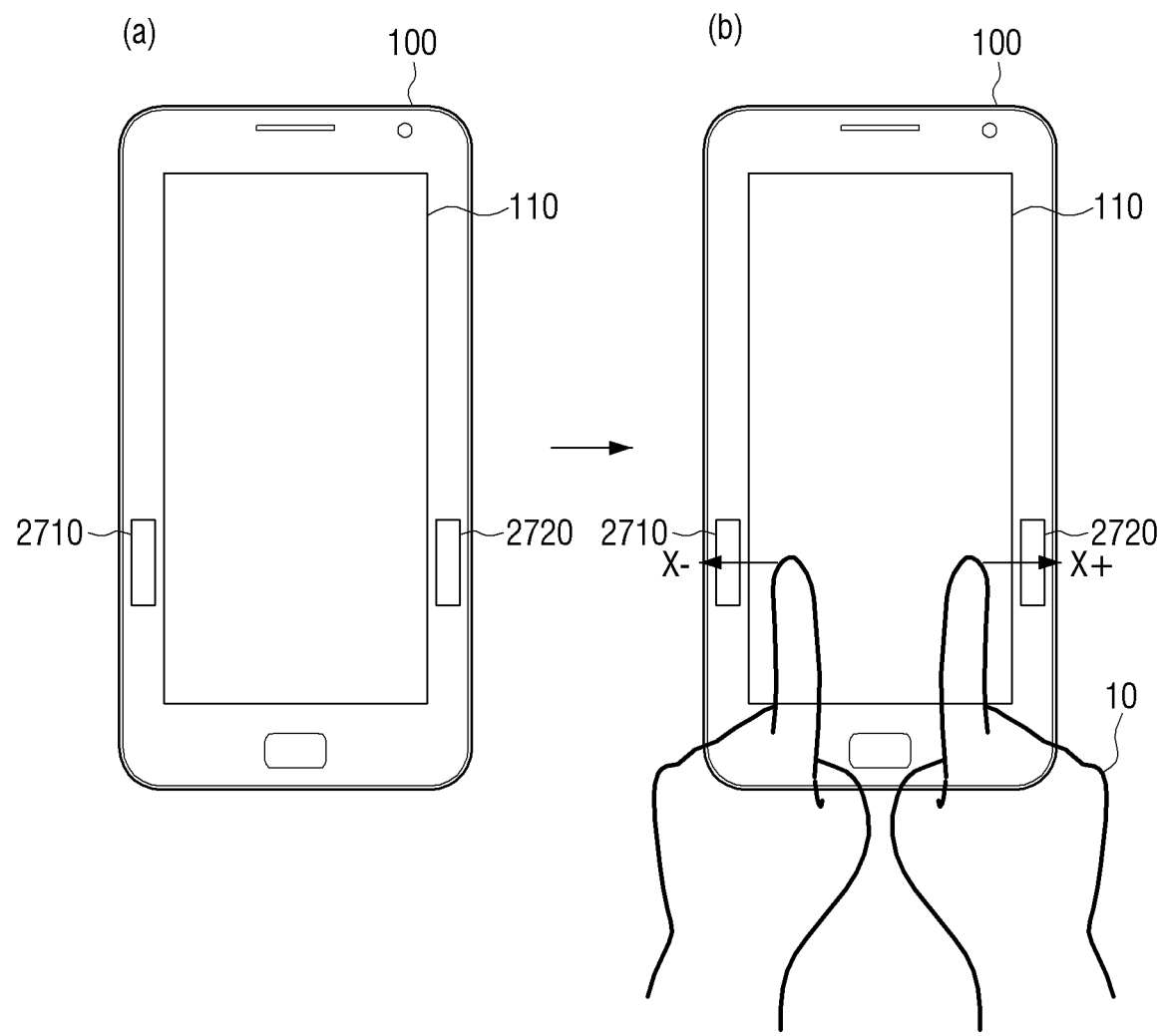
Figure 28:
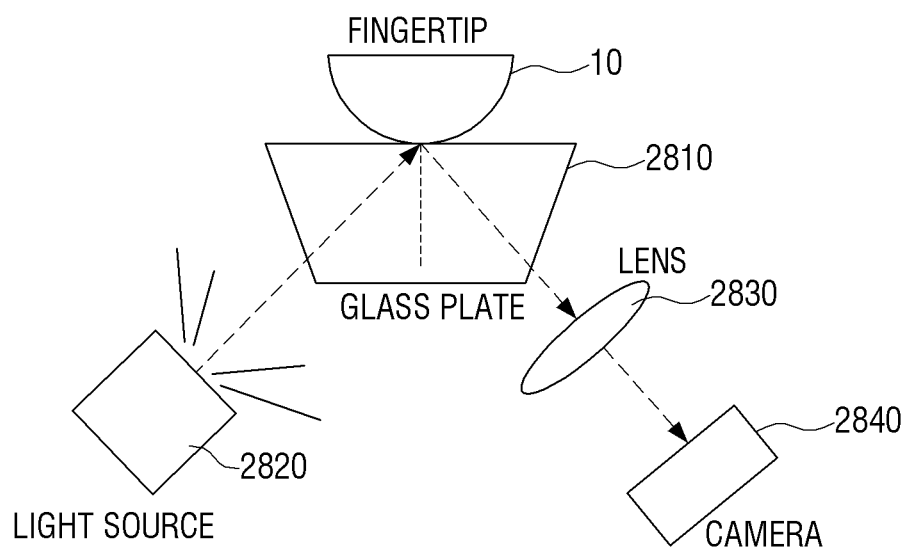
Figure 29:
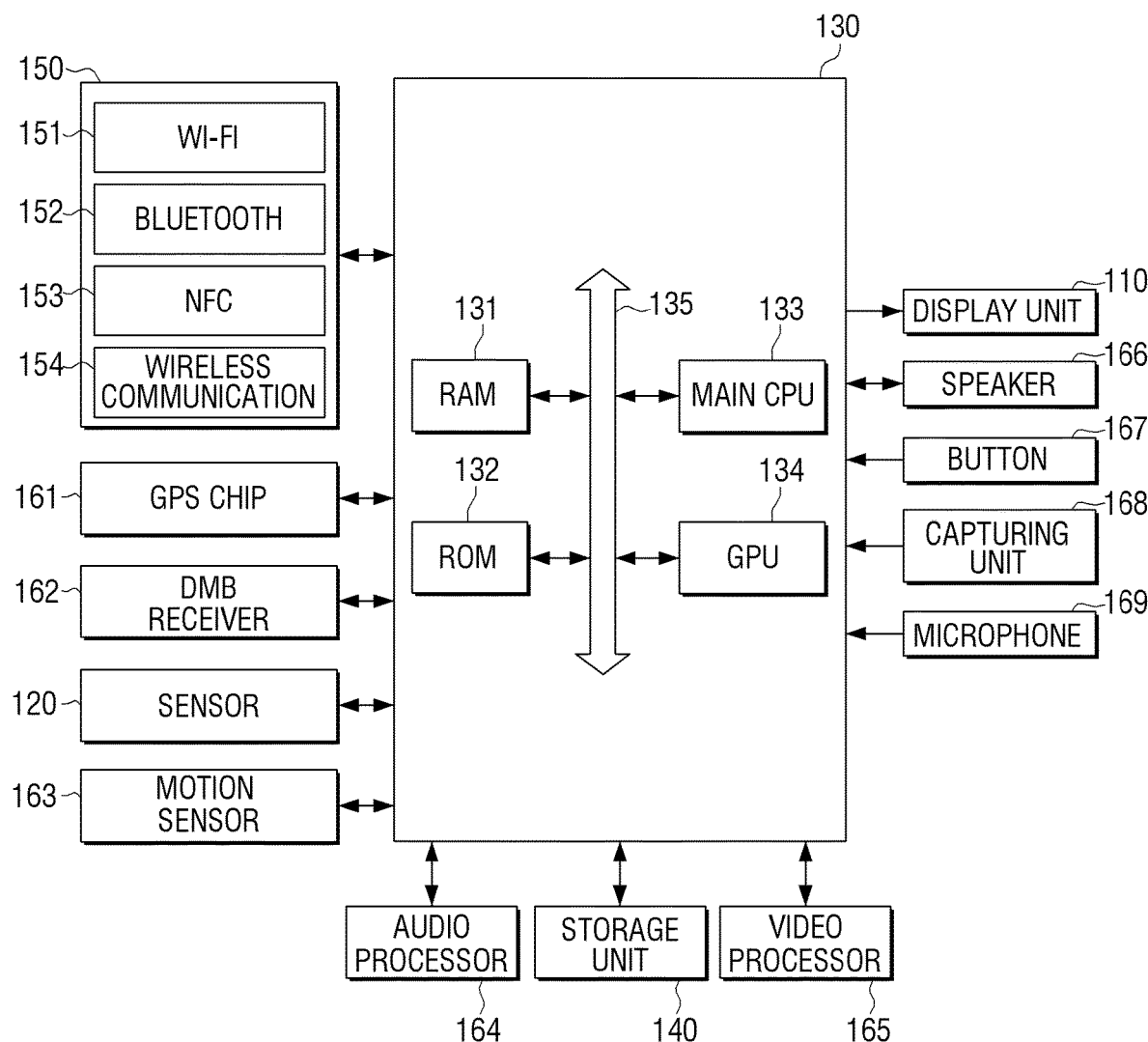
Figure 30:
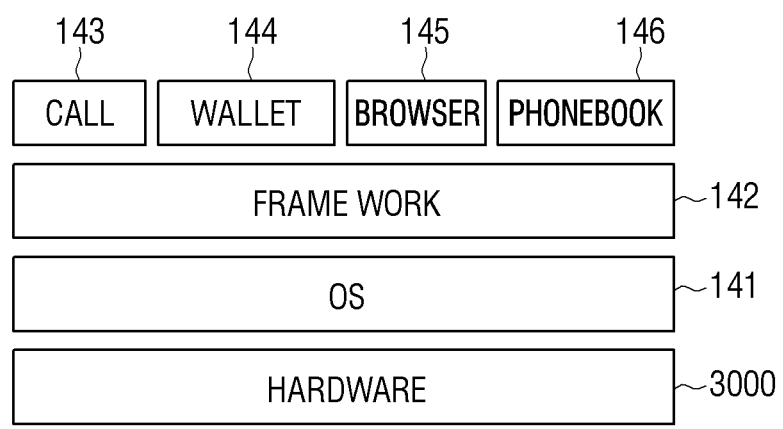
Figure 31:
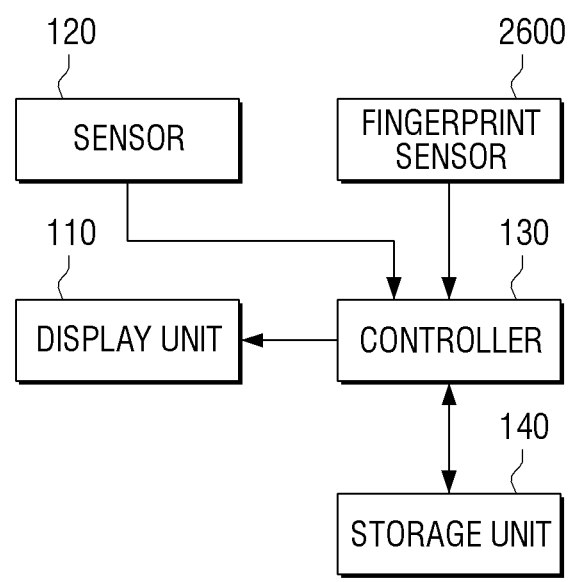
Figure 32:
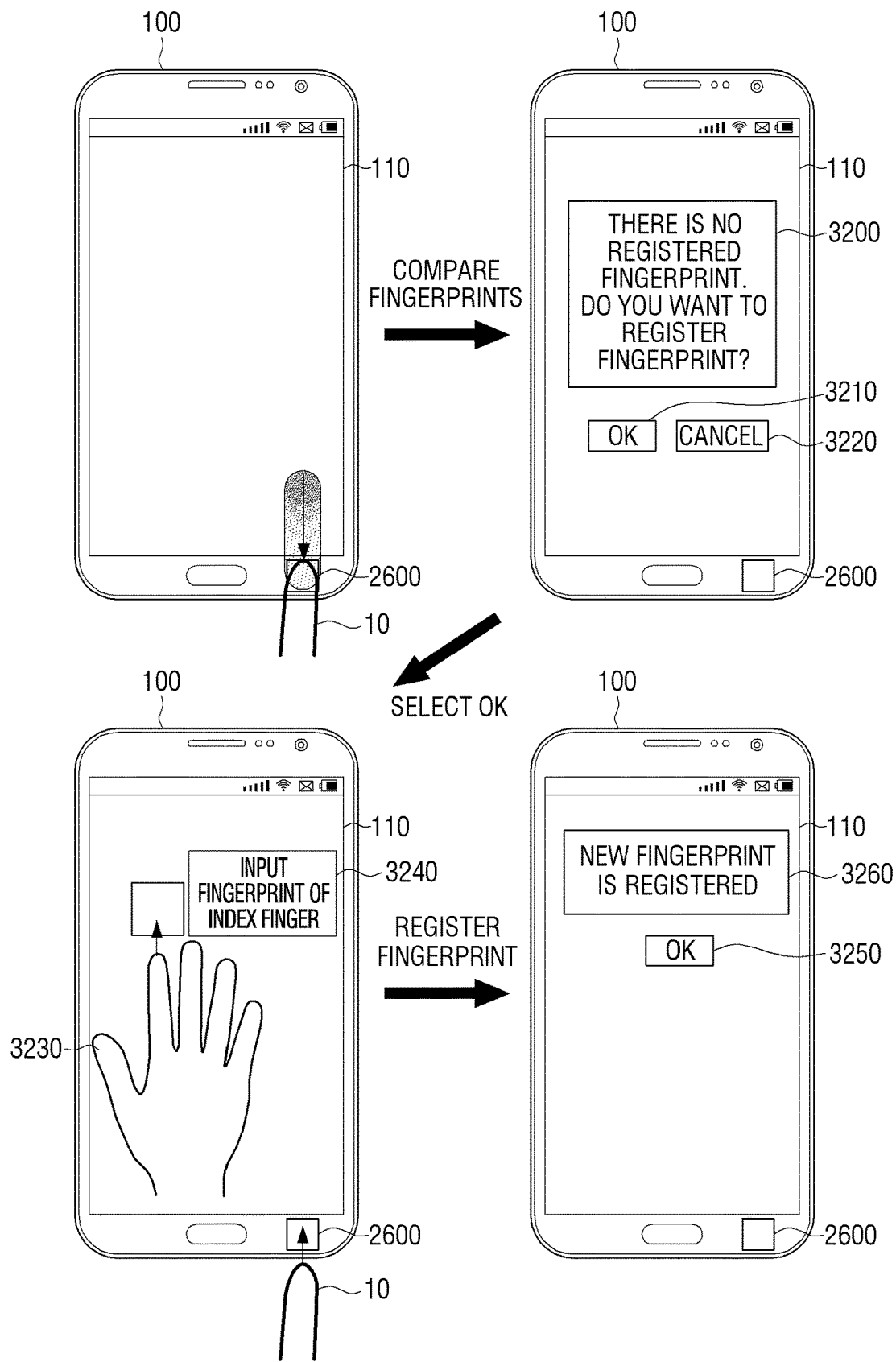
Figure 33:
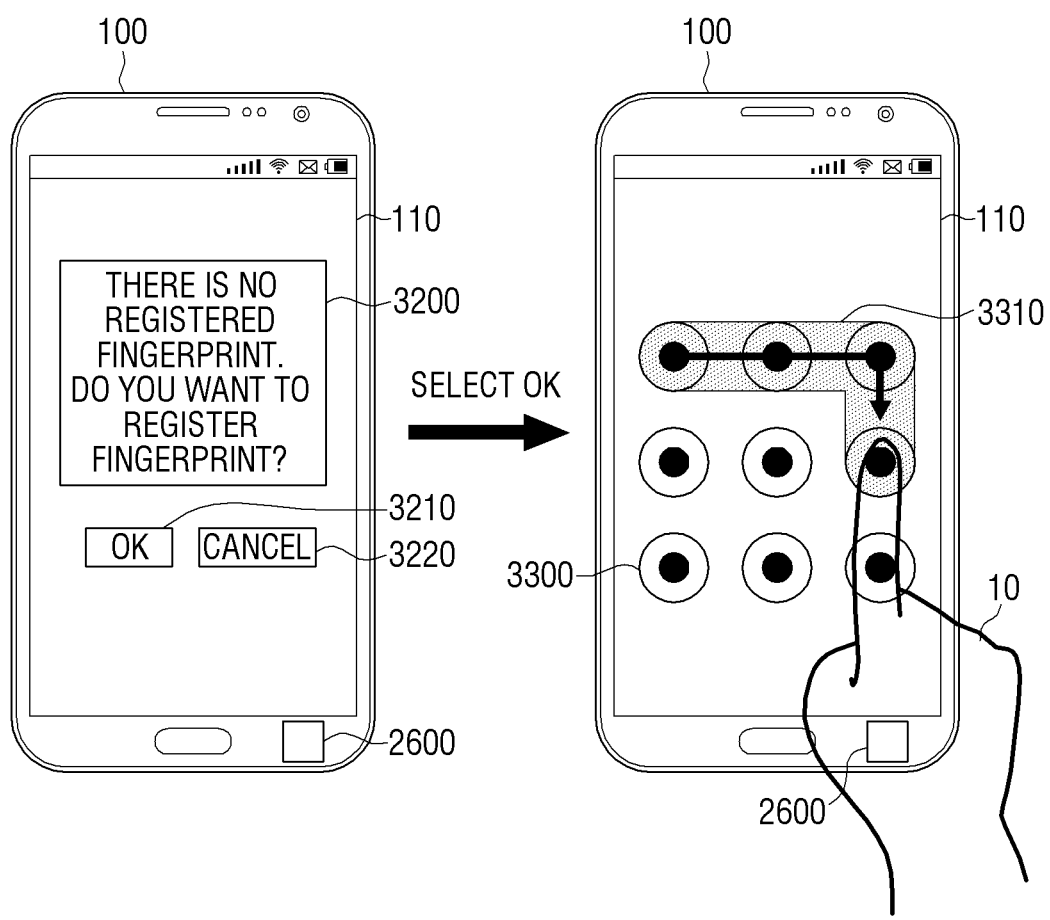
Figure 34:
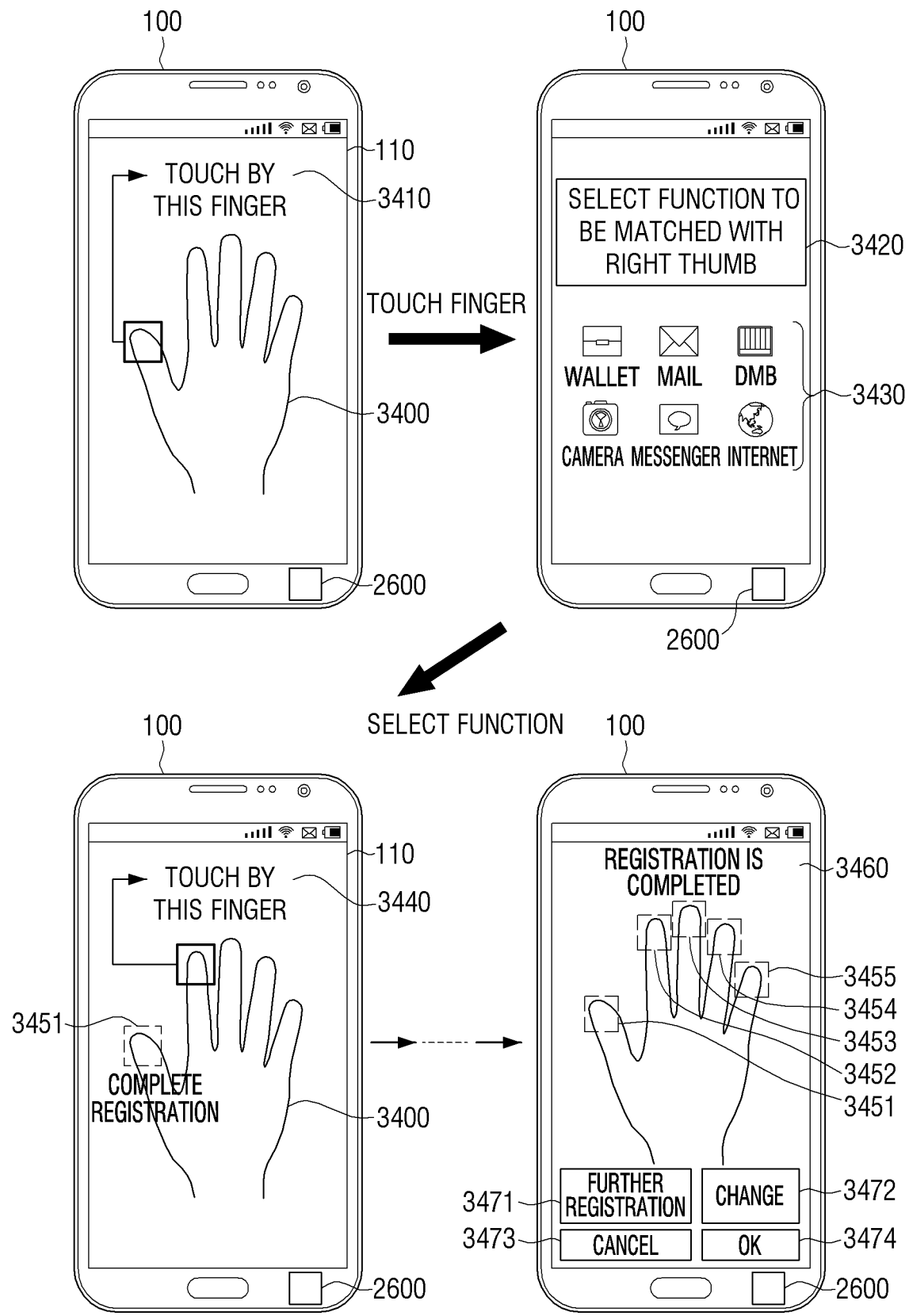
Figure 35:
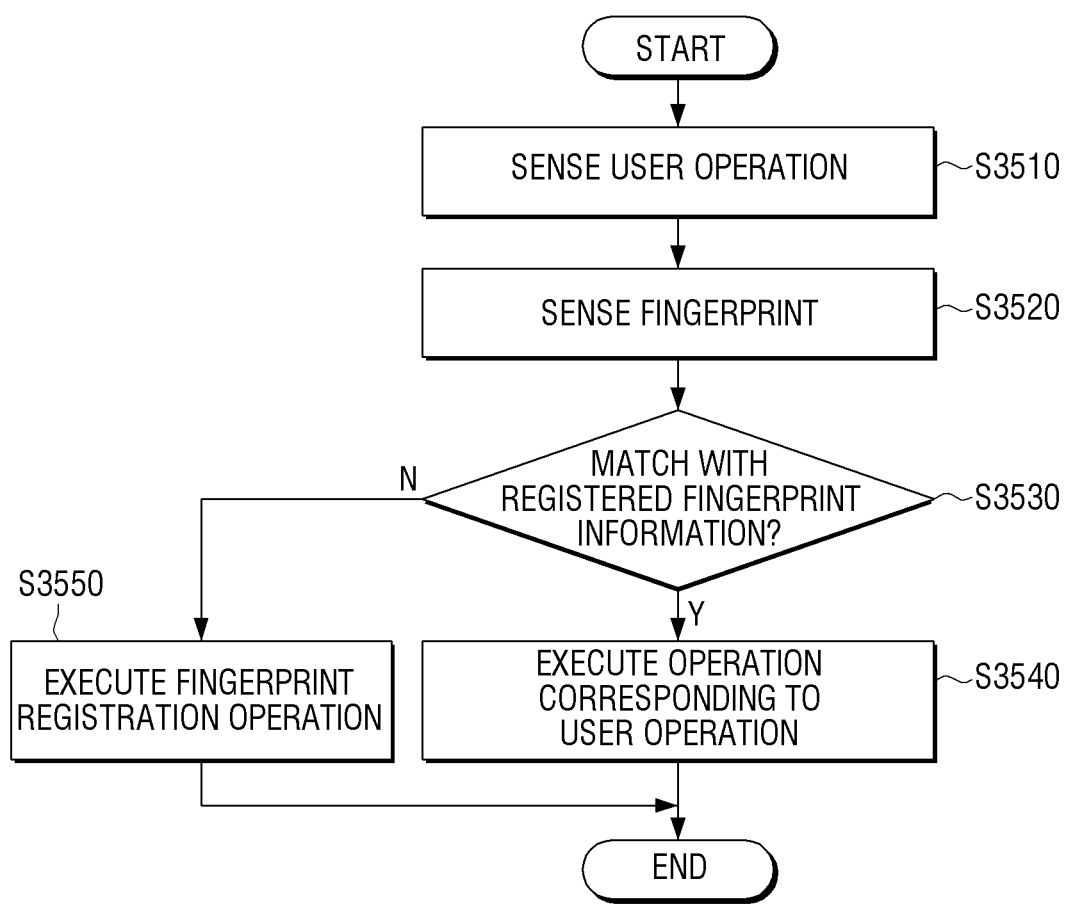
Figure 36:
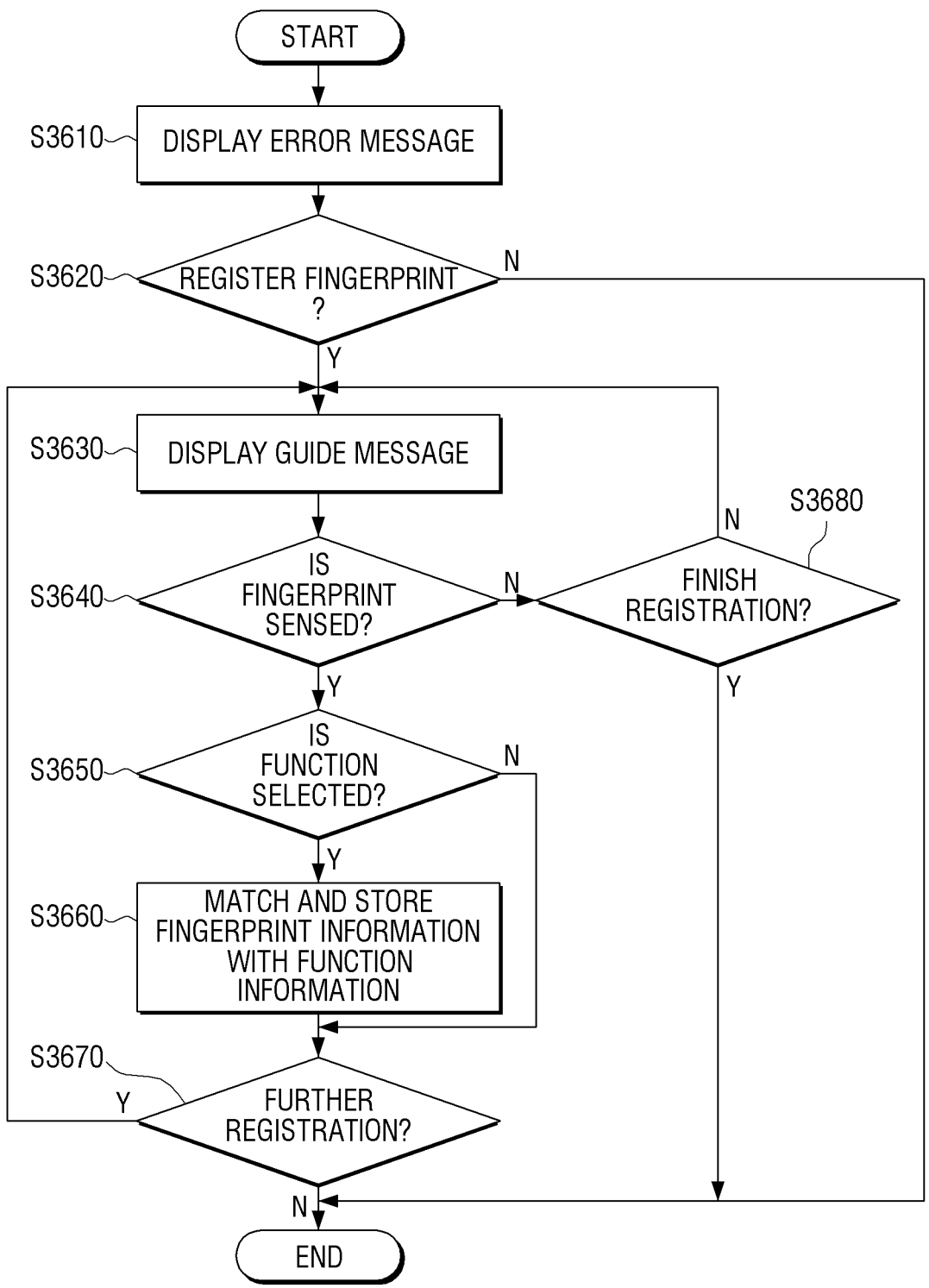

FIG. 21 a view illustrating an example of a setting screen of a wallet application;

FIG. 22 is a flowchart specifically illustrating a control method of a mobile device according to another exemplary embodiment;

FIG. 23 is a view illustrating a payment process of a mobile device according to another exemplary embodiment;

FIG. 24 is a view illustrating an example of an error message displayed when an incorrect passcode is entered;

FIG. 25 is a view illustrating an example of a payment completion message;

FIGS. 26 and 27 are view illustrating a control method of a mobile device according to other exemplary embodiments:

FIG. 28 is a view illustrating a method of recognizing a user's fingerprint;

FIG. 29 is a block diagram integrally illustrating a configuration of a mobile device according to various exemplary embodiments;

FIG. 30 is a view illustrating a software configuration of a mobile device according to an exemplary embodiment;

FIG. 31 is a block diagram illustrating a configuration of a mobile device according to another exemplary embodiment;

FIG. 32 is a view illustrating an example of an operation of the mobile device according to an exemplary embodiment;

FIG. 33 is a view illustrating an example of a user authorization process for registering a fingerprint according to an exemplary embodiment;

FIG. 34 is a view illustrating an example of a process of registering a plurality of fingerprints and functions according to an exemplary embodiment;

FIG. 35 is a flow chart illustrating a method of controlling a mobile device according to another exemplary embodiment; and FIG. 36 is a flow chart illustrating a method of registering a fingerprint of a mobile device according to another exemplary embodiment.

DETAILED DESCRIPTION OF THE EXEMPLARY EMBODIMENTS

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 1:
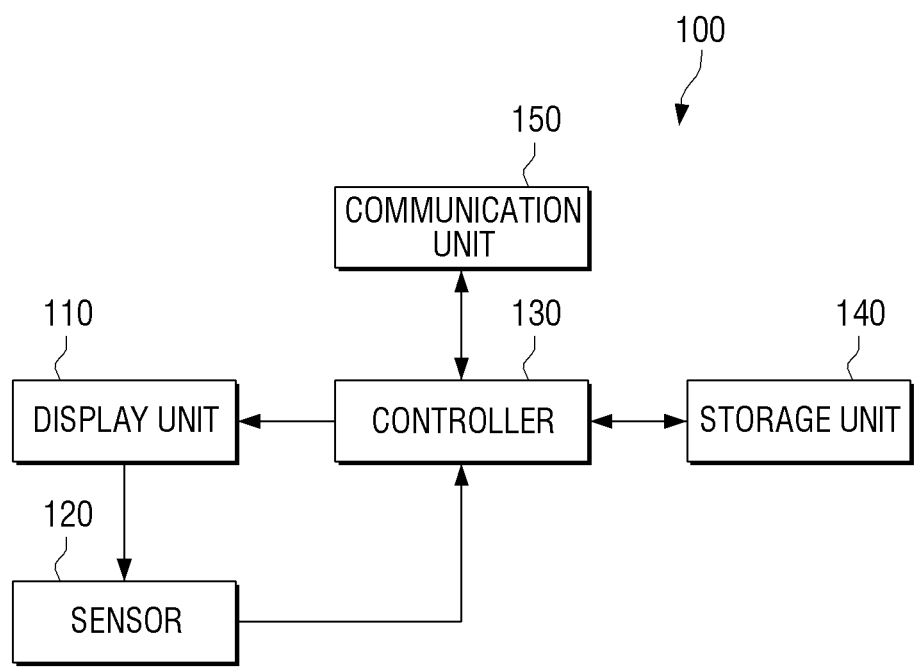
FIG. 1 is a block diagram illustrating a configuration of a mobile device according to an exemplary embodiment.

FIG. 1 is a block diagram illustrating a configuration of a mobile device according to an exemplary embodiment. The mobile device may be various types of apparatuses such as a mobile phone, a tablet PC, an electronic book, a personal digital assistant (PDA), an MPEG-1 audio layer 3 (MP3) player, and a laptop PC.

Referring to FIG. 1, the mobile device includes a display unit 110, e.g., display, a sensor 120, a controller 130, and a storage unit 140, e.g., storage.

The display unit 110 may be implemented with various types of displays such as a liquid crystal display (LCD), an organic light emitting diode (OLED) display, or a plasma display panel (PDP). A driving circuit which may be implemented with an amorphous (a-Si) thin film transistor (TFT), a low temperature polysilicon (LTPS) TFT, an organic TFT (OTFT), or the like, and a backlight unit, and the like are further included in the display unit.

The sensor 120 may sense user' touch done on a surface of the display unit 110. The sensor 120 may be implemented with various types of touch sensors such as a capacitive type touch sensor, a resistive type touch sensor, or a piezoelectric type touch sensor. The capacitive touch sensor is configured to sense microelectricity excited to a user's body using a dielectric coated on a surface of the display unit when a part of the user's body is touched on the surface of the display unit 110, and calculate a touch coordinate. The resistive type touch sensor is a configured to include two electrode plates built in the display unit 110, sense current through the upper and lower electrode plates in contact with each other at a touched point when the user touches a screen, and calculate a touch coordinate. Thus, the sensor 120 may sense various types of user's touch operations such as touch, touch and drag, flick, long tough, and double touch and various types of user operations such as a motion gesture, a motion gesture, and speech input.

The sensor 120 may sense the user touch in a disabled state of the display unit 110. The disabled state of the display unit 110 includes a state in which the display unit 110 displays a lock screen as well as a state in which the display unit 110 is off and a state in which the mobile device is in a sleep state. That is, the mobile device 100 automatically enters a lock state to turn off the display unit 110 when the user does not use the mobile device for above a certain period of time. In the screen off state, when a hardware button provided in a body of the mobile device is selected, the display unit displays a lock screen. When the user operation for performing an unlock operation on the lock screen, the mobile device releases the lock state and displays a main screen.

The controller 130 enables the sensor 120 to be consistently maintained in an activate state so that the sensor senses the user touch on a surface of the display unit 110 even in the disabled state of the display unit 110.

The storage unit 140 stores operating system (OS) for driving the mobile device, programs, data, and various kinds of contents. Preset gesture information is included in the data stored in the storage unit 140.

When the user touch is sensed by the sensor 120, the controller 130 determines whether or not the user touch operation matches the gesture information stored in the storage unit 140. When it is determined that the user touch operation matches the gesture information, the controller 130 activates the display unit 110, automatically executes an application corresponding to the user touch operation, and immediately displays an execution screen of the application. The application corresponding to the user touch operation may be set by the intention of the designer or the user. In the exemplary embodiment, an example in which a wallet application, which is capable of providing shopping service such as a payment and purchase history management, matches the user touch operation is illustrated. That is, the controller 130 immediately displays the execution screen of the wallet application when a specific user touch operation is input even in the disabled state of the display unit 110.

The communication unit 150 is configured to perform communication with an external apparatus. The communication unit 150 may perform the communication with the external apparatus using at least one of various communication methods such as a wireless local area network (LAN), wireless fidelity (Wi-Fi), Bluetooth, Zigbee, near field communication (NFC), and the like.

With regard to shopping service, the communication unit 150 may perform communication with external apparatuses, for example, server apparatuses such as servers of operators operating various online shopping mall sites, portal site servers, or cloud servers, and servers of service providers providing point of sale system (PoS) or other payment gateway (PG) service.

As one example, assuming that the communication unit 150 performs communication with the PoS, when the user selects one payment option on an execution screen of a wallet application and then inputs a payment command, the communication unit 150 transmits information for the selected payment option to the PoS and performs a payment. At this time, a short-range wireless communication method such as NFC may be used. That is, when the communication unit 150 includes an NFC module, the information for the payment option may be transmitted by NFC tagging to the PoS. The NFC tagging means a behavior which approaches and touches the external apparatus (that is, PoS and the like) within a distance range which can perform short-range wireless communication.

Figure 2:
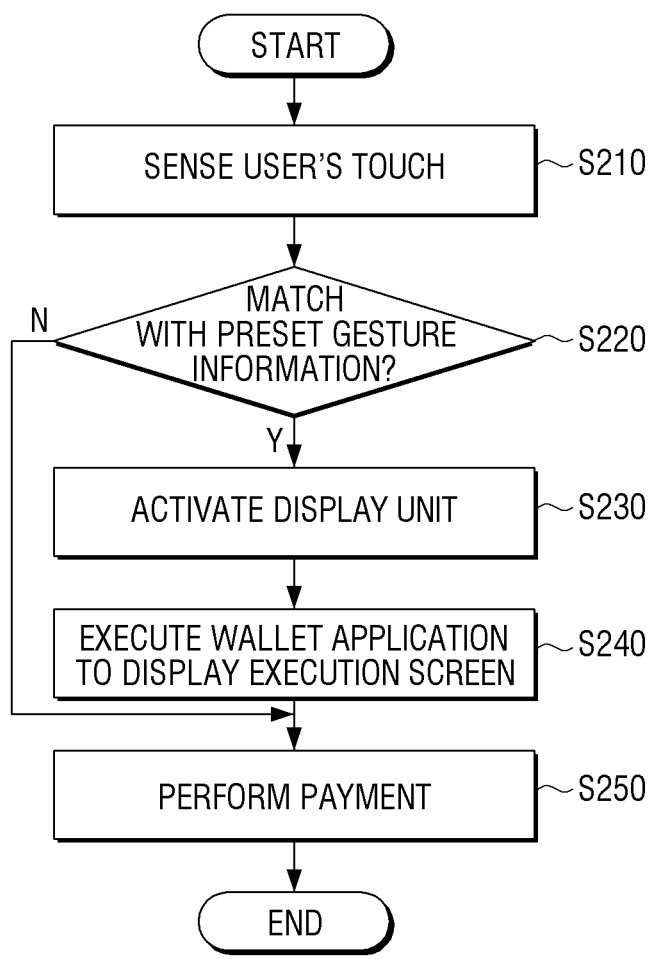
FIG. 2 is a flowchart illustrating a control method of a mobile device according to an exemplary embodiment.

FIG. 2 is a flowchart specifically illustrating a payment method performed in the mobile device of FIG. 1. Referring to FIG. 2, when the user touch is sensed (S210), the controller 130 determines whether or not the sensed touch content matches preset gesture information (S220). The gesture information means information in which various items, for example, a location of a first touch point, the number of touch points, change in the touch point, change in a direction, trajectory, speed, etc., are combined.

The controller 130 activates the display unit (S230) when it is determined that the sensed touch content matches the gesture information, executes a wallet application, and immediately displays an execution screen of the wallet application (S240). When the user's next operation is performed on the execution screen, the payment is performed according to the user's next operation (S250). When a payment option set to default exists on the execution screen of the wallet application, the payment may be directly done only through a simple operation such as NFC tagging or button selection without a separate process of selecting a payment option on the execution screen.

According to the above-described exemplary embodiment, the payment is performed only through simple one or two operations of the user even when the mobile device is in a lock state, so that shopping service may be conveniently used.

Figure 3:
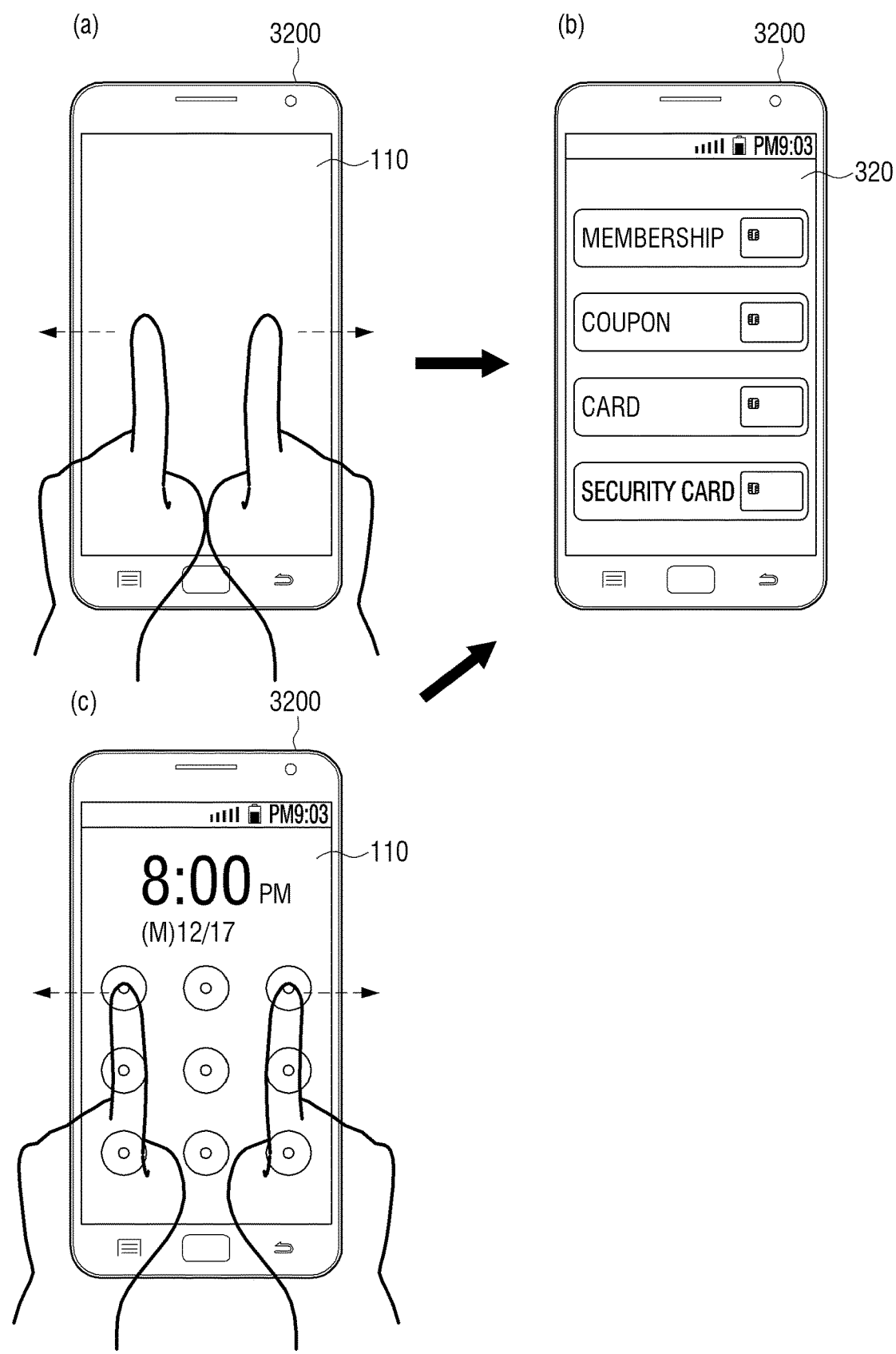
FIG. 3 is a view illustrating an example of a user' operation for immediately executing a wallet application in a mobile device.

FIG. 3 is a view illustrating an example of a user's operation for executing a wallet application. In FIG. 3, 3200a illustrates that a display unit 110 is in an off state, that is, in a screen off state, or illustrates that the mobile device is in a sleep state. In this state, the user gestures to touch two points T1 and T2 on a surface of the display unit 110 using two fingers and then to spread the two fingers at both sides, the controller 130 performs an unlock operation, immediately executes the wallet application, and displays an execution screen 320 as illustrated in 3200b.

In FIG. 3, 3200c illustrates that the display unit 110 displays a lock screen 310. When the user performs a preset first user operation on the lock screen 310, unlock is done, and thus a home screen may be displayed. On the other hand, when the user performs a preset second user operation on the lock screen 310, the unlocking is done, and thus the execution screen 320 of the wallet application may be immediately displayed. Here, the second user operation may gesture that the user touches the two points T1 and T2 and spreads a gap between the two points.

As the gesture information in the exemplary embodiment of FIG. 3, coordinate ranges of the points T1 and T2 at which first touch is done, a trajectory and direction of changes in touch points after the first touch, and the like have been preset and stored in the storage unit 140. Thus, when the gesture information has been strictly set, execution of the wallet application due to the user's unintended touch may be prevented in the mobile device 100.

The wallet application may manage various pieces of information related to the shopping service. The shopping service may be largely divided into a process of searching and selecting goods, a process of purchasing, and a process of managing after the process of purchasing.

The good search and selection may be performed both on-line and off-line. Specifically, the controller 130 may execute a web browser, access to Internet, and display a site screen provided from various online shopping malls. The user searches for and selects his/her desired goods while the user views the site screen. Additional service such as a wish list may be provided in the selecting process. That is, the user has stored the goods, which are not immediately purchased but intended to purchase, in the wish list and then determines to purchase later. On the other hand, the process of searching for and selecting goods may be done off-line. Specifically, the user directly looks at and chooses the goods in department stores or shops.

When the process of searching for and selecting the goods is performed as described above, the purchase of the goods, that is, a payment may be done through the mobile device. Specifically, the mobile device 100 may perform the payment using the wallet application. In the wallet application, the payment may be performed using information for various payment options such as a credit card, an identifier (ID) card, a point card, a coupon, and an event card which are possessed by the user. The specific payment method using the wallet application will be described in more detail later.

After the purchase of the goods is done, the user may receive an electronic receipt or bill and manage a purchasing history. Thus, the wallet application may recognize purchase propensity of the user to recommend appropriate goods, purchase time, a purchase place, and the like, and further recognize problems and advice for the user to refrain from indiscreet purchase.

To provide various shopping services, the wallet application may store and manage various pieces of information related to shopping.

Figure 4:
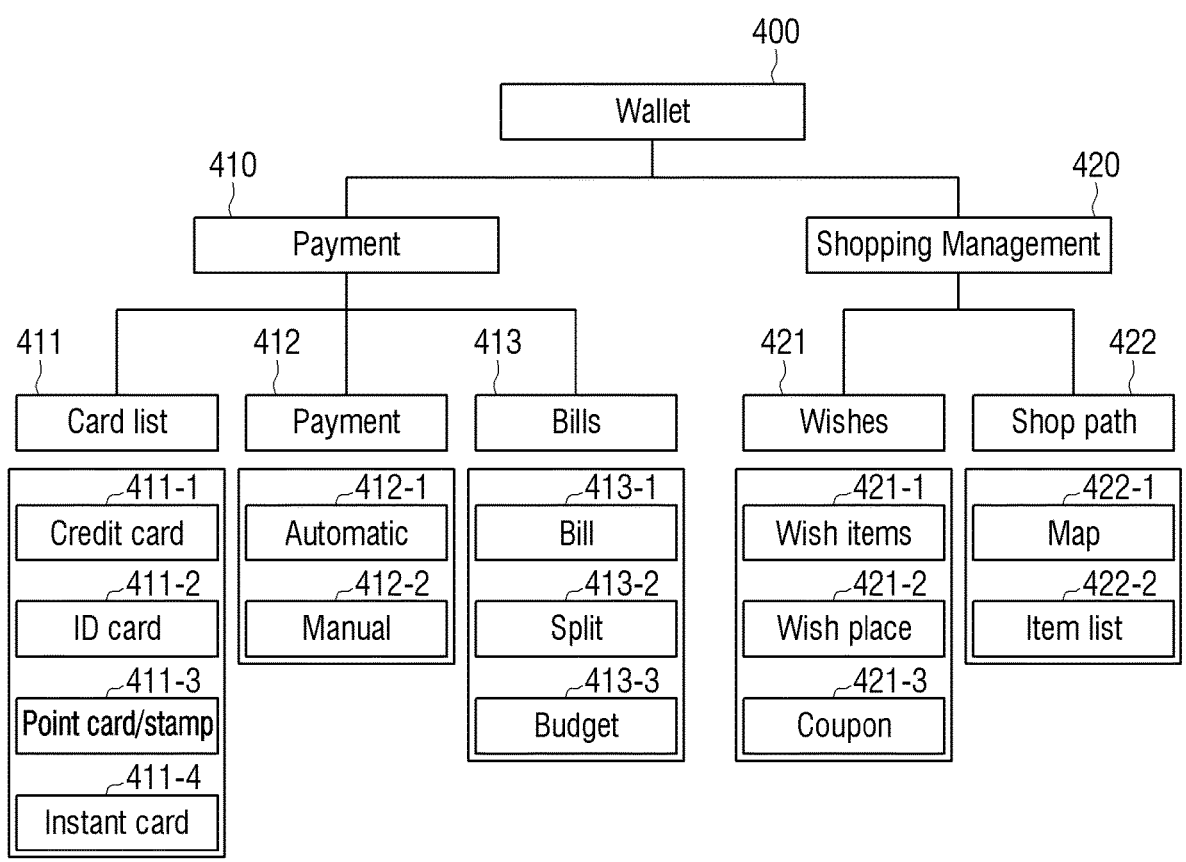
FIG. 4 is a view illustrating an example of an information system managed by a wallet application.

FIG. 4 illustrates an example of an information system managed by a wallet application according to an exemplary embodiment.

Referring to FIG. 4, a wallet application 400 may be divided into a payment part 410 configured to be in charge of an amount payment and a shopping management part 420. Information such as a card list 411, a payment mode 412, and bills 413 is managed in the payment part 410 and information such as wishes 421 and a shop path 422 is managed in the shopping management part 420.

The card list 411 includes card information such as credit card information 411-1, ID card information 411-2, point card/stamp information 411-3, and instant card information 411-4 and the payment mode 412 includes mode information such as an automatic mode 412-1 and a manual mode 412-2. In addition, the bills information 413 includes information such as a bill 413-1, a split 413-2, and a budget 413-3. The wishes information 421 includes information such as wish items 421-1, a wish place 421-2, and a coupon 421-3 and the shop path information 422 includes information such as a map 422-1 and an item list 422-2.

The controller 130 may execute the wallet application 400 to manage and use various pieces of information as illustrated in FIG. 4. Hereinafter, various user interface screens displayed in the display unit 110 according to the execution of the wallet application and a method of using the same will be described in detail.

Figure 5:
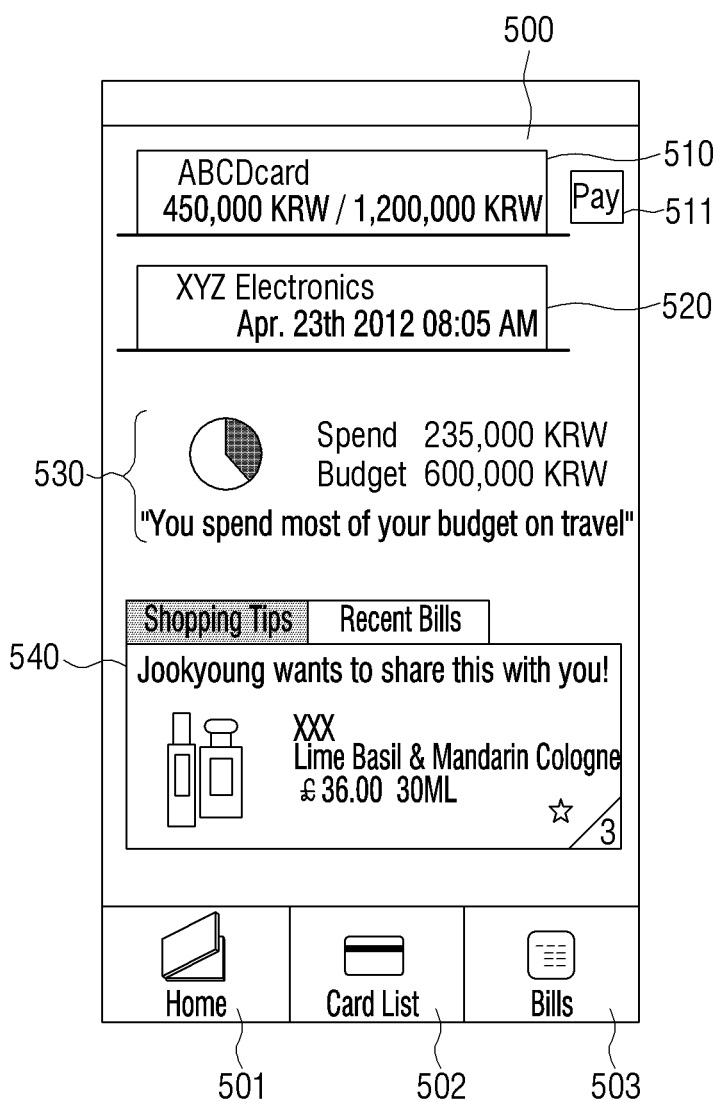
FIG. 5 is a view illustrating an example of a main execution screen of a wallet application.

FIG. 5 illustrates an example of a home screen 500 of a wallet application. Credit card information 510, ID card information 520, payment detailed and predicted information 530, shopping guide information 540, menus 501, 502, and 503, and the like are displayed in the home screen 500.

The credit card information 510 indicates information for a credit card most frequently used or set to default. A card company, a card name, a total amount used this month, specified limit, a total amount used last month, and the like may be displayed together with the information for the credit card in the credit card information 510. Further, a pay button 511 configured to immediately perform a payment using the corresponding credit card may be displayed at one side of the credit card information 510.

The ID card information 520 may display information for a basic ID card issued by institutions such as a company or a school. Absenteeism and tardiness and admittance relevant records, and the like may be also displayed in the ID card information 520.

An amount used this month, an estimated amount to be spent, a guide message, and the like may be displayed in the payment detailed and predicted information 530. The guide message may be displayed in various contents according to a case in which expected spending and a budget are balanced, a case in which spending for a specific category is large, a case in which the expected spending is larger than the budget, a case in which the expected spending is smaller than the budget, and the like.

The shopping guide information 540 is divided into a plurality of tabbed pages. FIG. 5 illustrates a state in which the shopping guide information 540 is divided into tabbed pages such as shopping tips and recent bills. Information for recommending shopping to the user is displayed in the shopping tips. The 'shopping tips' may be displayed when an item, which satisfies a condition such as a schedule, time, a purchasing pattern, and a current location, exists among items registered in the wish list generated by the user. Information related to a split payment requested by a friend, contents for split payment request, recent receipts of purchase, and the like may be displayed in the 'current bills'. When the 'recent bills' is selected, a detailed view screen for social network service (SNS) or e-mail requesting the spilt payment and an electronic receipt, and the like may be displayed.

In addition, as illustrated in FIG. 5, in the menu region, a home menu 501 for shortcut to a payment home screen, a card list menu 502 for shortcut to a screen providing various cards relevant information, the bills menu 503 for providing information relevant to a list of purchase records of the user and spending, and the like may be displayed. Although not shown, in the menu region, a wishes menu for displaying a list in which information for goods or shops interested on-line/off-line, or coupon/discount information is collected or a 'shopping path' menu for displaying a path on a map by automatically grouping the closest path among items registered in the wishes list or by grouping items selected by the user may be further displayed.

Figure 6:
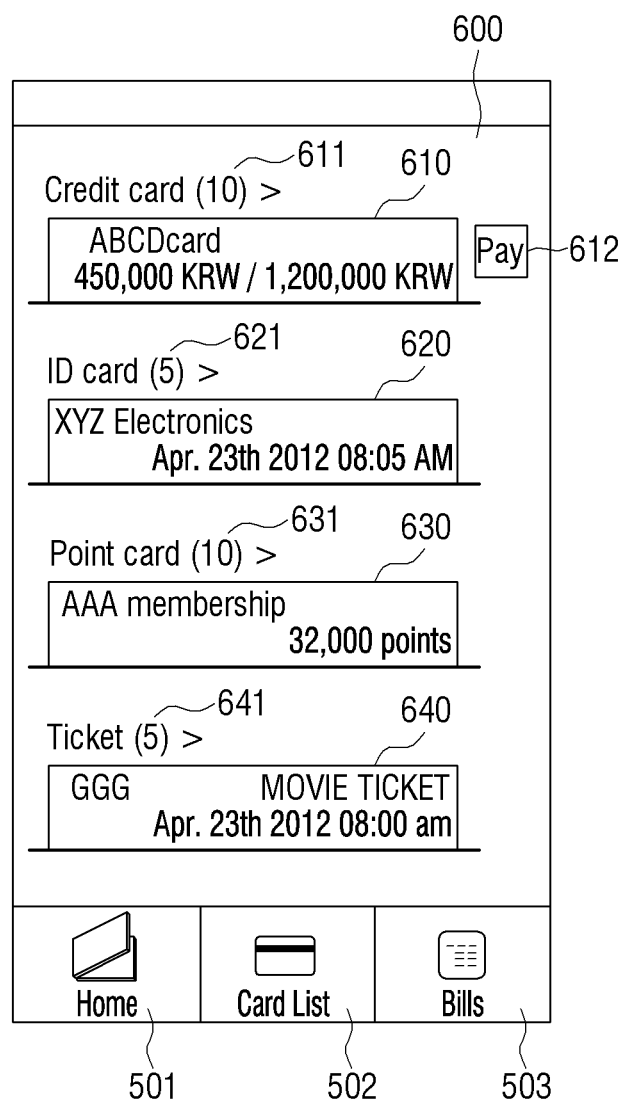
FIGS. 6 and 7 are views illustrating examples of card list screens.

FIG. 6 illustrates an example of a card list screen displayed when the card list menu 502 is selected in the payment home screen 500. Referring to FIG. 6, a credit card item 611, an ID card item 621, a point card item 631, a ticket item 641, and the like are displayed in the card list screen 600. Information 610, 620, 630, and 640 for one representative card is displayed in each item. The menu area 501, 502, and 503 illustrated in FIG. 5 are kept the same in FIG. 6.

The number (for example, 10) of registered credit cards is displayed in the credit card item 611. When the credit card item 611 is selected, lists for all stored cards may be displayed. The lists will be described in further detail later. Further, a pay button 612 may be displayed in the credit card item 611. The pay button 612 is a button configured to immediately perform a payment using a credit card displayed in the card information 610. When the user presses the pay button 612, the controller 130 progresses a payment process using the displayed credit card. Specifically, the detailed payment process will be described in more detail later.

The ID card item 621 may be displayed in the same manner as the credit card item 611. That is, information 620 for one representative card may be also displayed.

The point card item 631 is an item for displaying loyalty cards such as various types of point cards, mileage cards, and stamps. The ticket item 641 is an item for displaying information of cards for one-time use such as a ticket, a parking ticket and a gift card.

FIGS. 5 and 6 have illustrated the examples of screens implemented in products in which a height length of a display is larger than a width length thereof, such as a mobile phone, but may be applied to a mobile device including a display in which a width length is larger than a height length, such as tablet personal computers (PCs).

Figure 7:
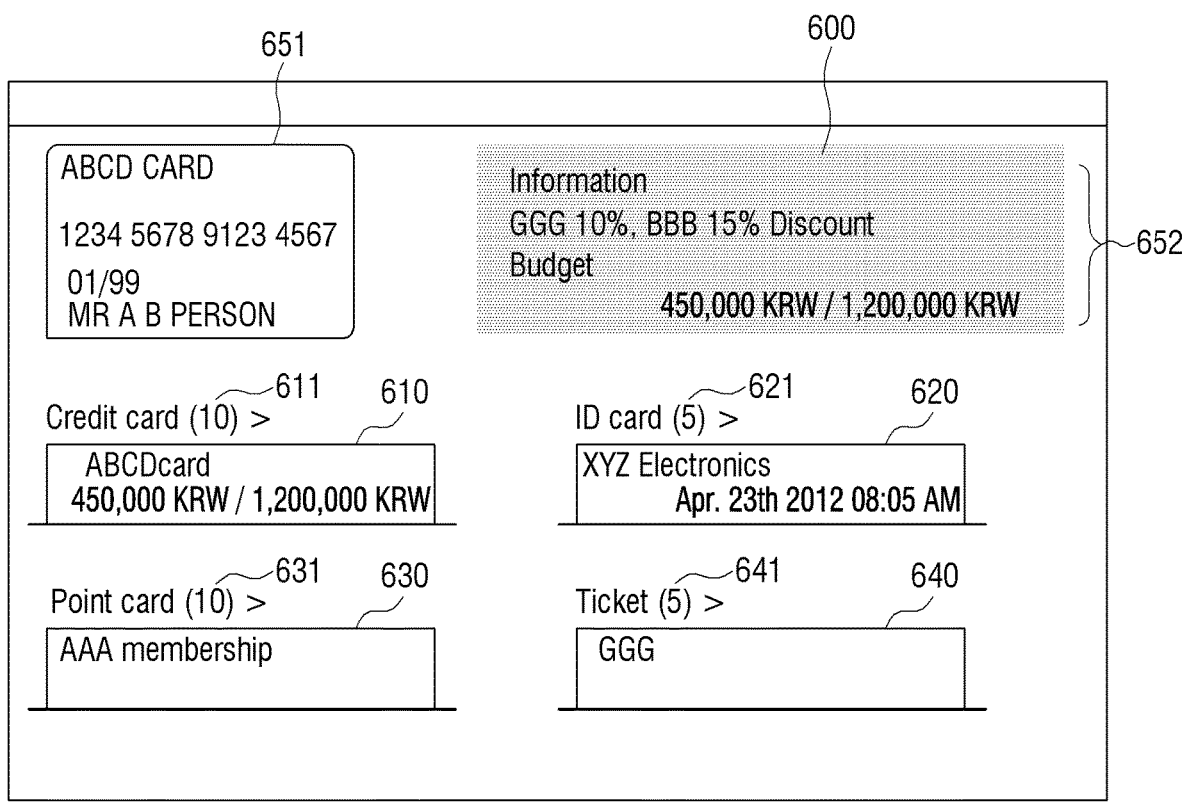

FIG. 7 illustrates a layout of a card list screen 600 in which a width length is larger than a height length. Referring to FIG. 7, an image 651 of a representative card and information 652 for the representative card may be displayed in the card list screen 600 together with card items 611, 621, 631, and 641 and card information 610, 620, 630, and 640. Therefore, a payment using the representative card may be immediately done in the card list screen 600 without a process of selecting a separate payment option again.

When the mobile device may sense a rotation state thereof, if the mobile device 100 is rotated 90 degrees to the left or to the right while displaying the card list screen as illustrated in FIG. 6, the screen is converted into the layout as illustrated in FIG. 7.

Figure 8:
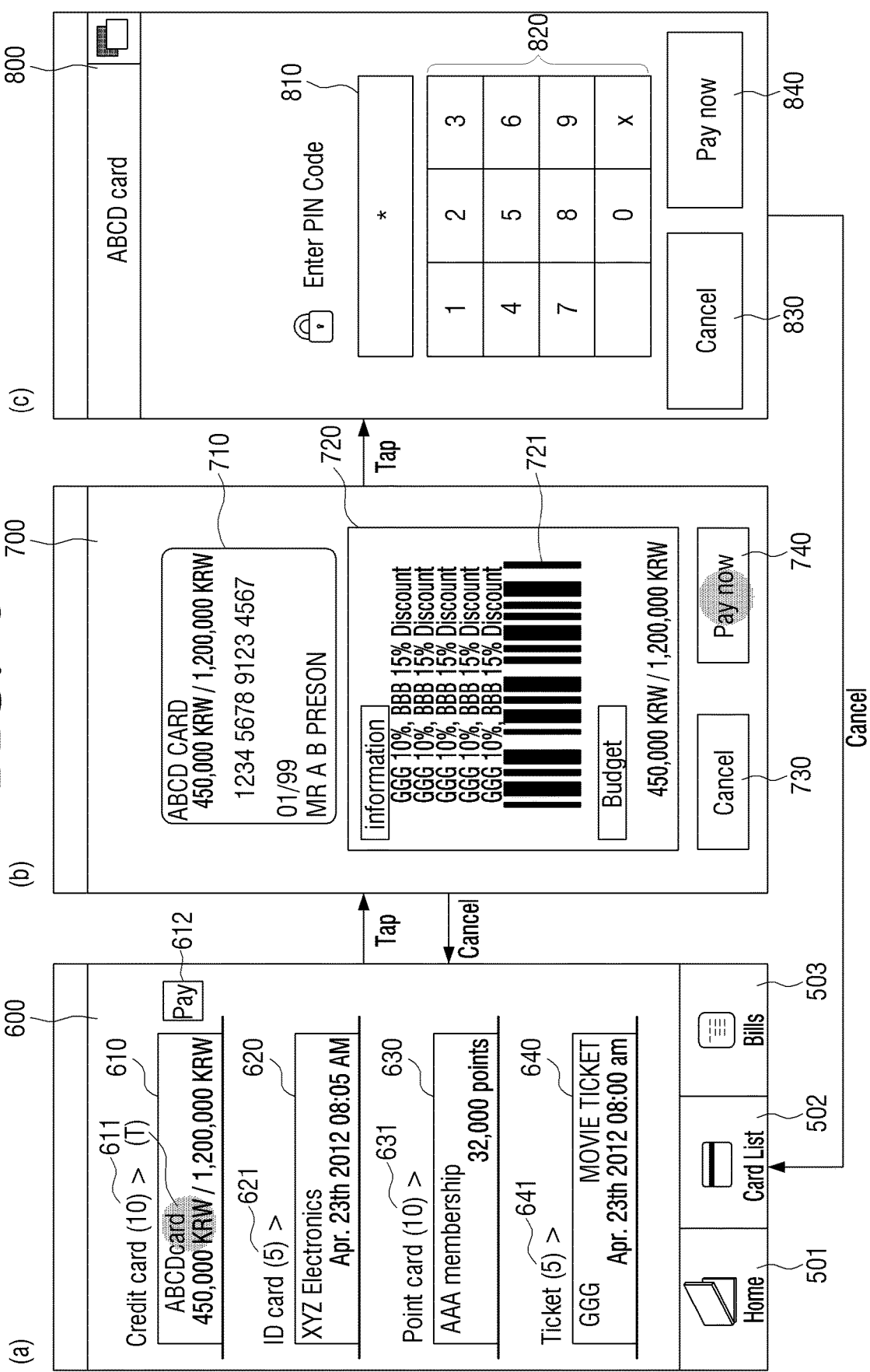
FIG. 8 is a view illustrating a process of performing a payment through a card list screen.

FIG. 8 illustrates an example of a process of performing a payment through card selection. 8000a illustrates the card list screen 600. When the user touches (T) the card information 610 in the card list screen 600, the detailed information screen 700 for a selected card, that is, a representative card is displayed as illustrated in 8000b. A front image 710 of the card, card benefit information 720, selection menus 730 and 740, and the like may be displayed in the detailed information screen 700. A bar code 721 including card information, and the like may be displayed in the card benefit information 720. Thus, the payment may be performed using the mobile device in a PoS including a bar code reader.

When the user selects the pay menu 740 in the detailed information screen 700, the detailed information screen 700 is converted into a personal identification number (PIN) input screen 800 as illustrated in 8000c. An input region 810, a key pad 820, selection menus 830 and 840, and the like may be displayed in the PIN input screen 800. When the user inputs a correct passcode through the key pad 820, the mobile device transmits payment information to the external apparatus and performs the payment.

When the items 611, 621, 631, and 641 are selected on the card list screen, the lists for the cards registered in the corresponding items may be displayed.

Figure 9:
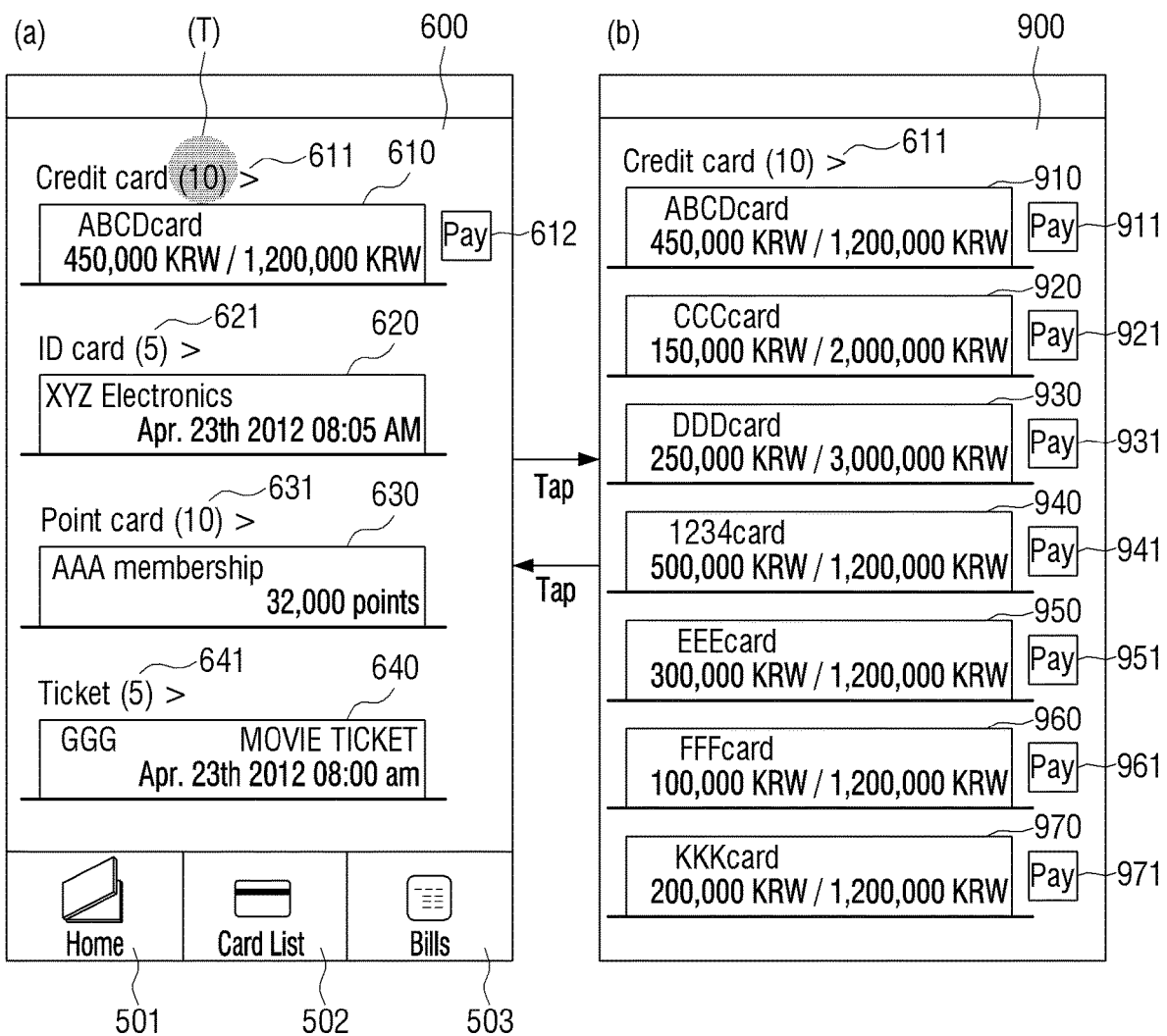
FIG. 9 is a view illustrating a screen specifically displaying a credit card list.

FIG. 9 illustrates an example of screen conversion when an item is selected on the card list screen. When the credit card item 611 is selected in the card list screen 600 as illustrated in 9000a, the controller 130 displays a credit card list 900 using information for the credit cards of the user registered in the storage unit 140 or an external server apparatus as illustrated in 9000b. Various pieces of card information 910 to 970 and pay buttons 911 to 971 for the respective cards are displayed in the list 900. Only the pay buttons 911 to 971 for the credit cards may be displayed.

When a portion of the credit card item 611 is touched (T) in the list 900, the controller 130 may convert the credit card screen 900 into the screen as illustrated in 9000a again and display the converted screen. When the user uses other credit cards other than the credit cards most frequently used, the user may select the payment option in a state in which the list is displayed as illustrated in 9000b. In the top of the list as illustrated in 9000b, a card designated to a default card by the user or most frequently used, that is, a representative card is displayed. The user may perform long tapping or touching and dragging on one card on the list 900 to change a location of the card or to delete the card from the list 900. Further, when a large number of cards which may not be displayed in one screen are registered, the user may perform scrolling on the card list screen in a vertical direction.

Figure 10:
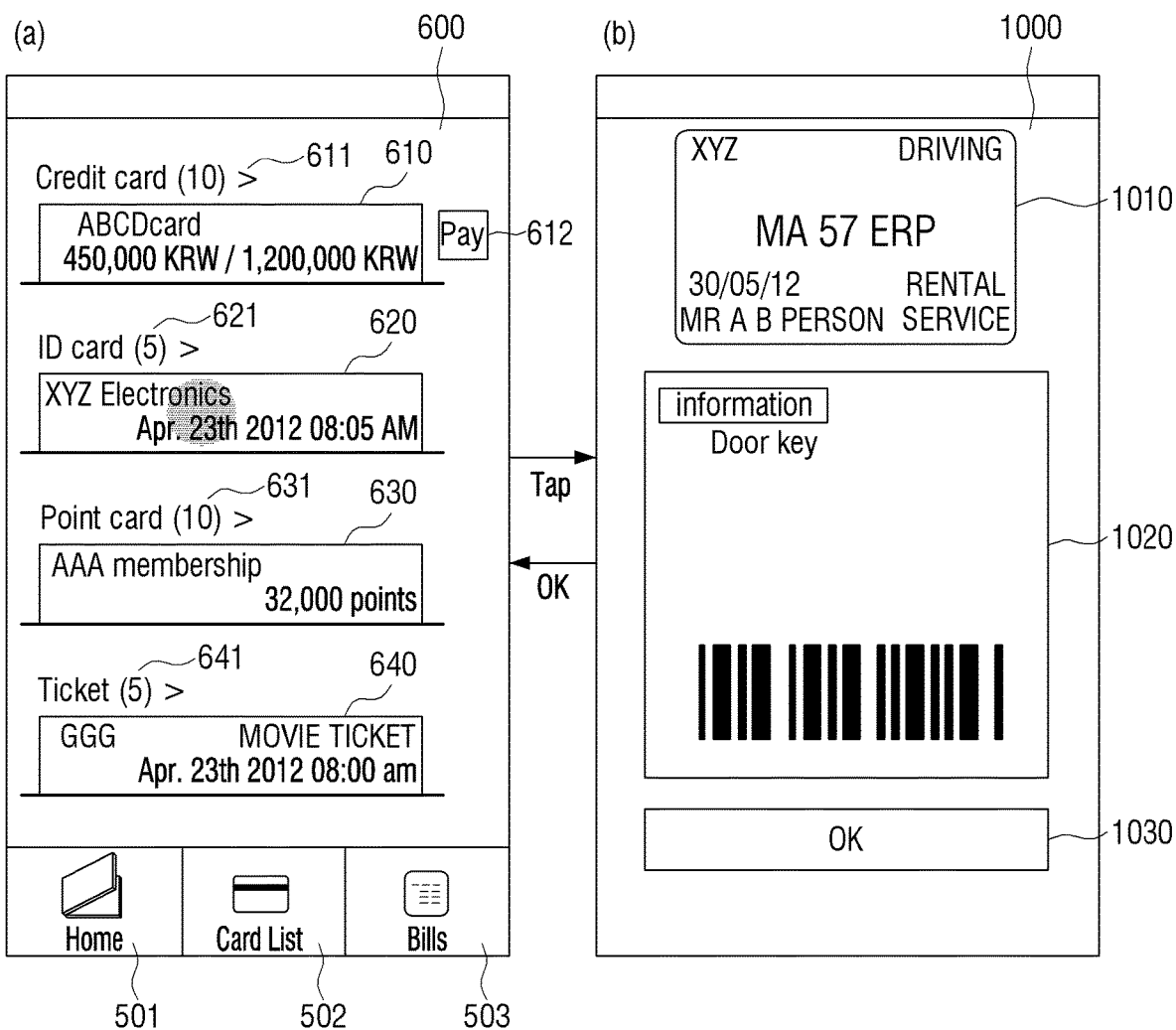
FIG. 10 is a view illustrating a screen specifically displaying an identifier (ID) card list.

FIG. 10 illustrates an example in which an ID card is selected. When the ID card information 620 displayed below the ID card item 621 in 10000a is selected, the controller 130 displays a detailed information screen 1000 for the selected ID card. An ID card image 1010, detailed information 1020 including a bar code and the like, an OK button 1030, and the like may be displayed in the detailed information screen 1000. When the OK button is selected, the screen 1000 may be converted into the screen as illustrated in 10000b.

Figure 11:
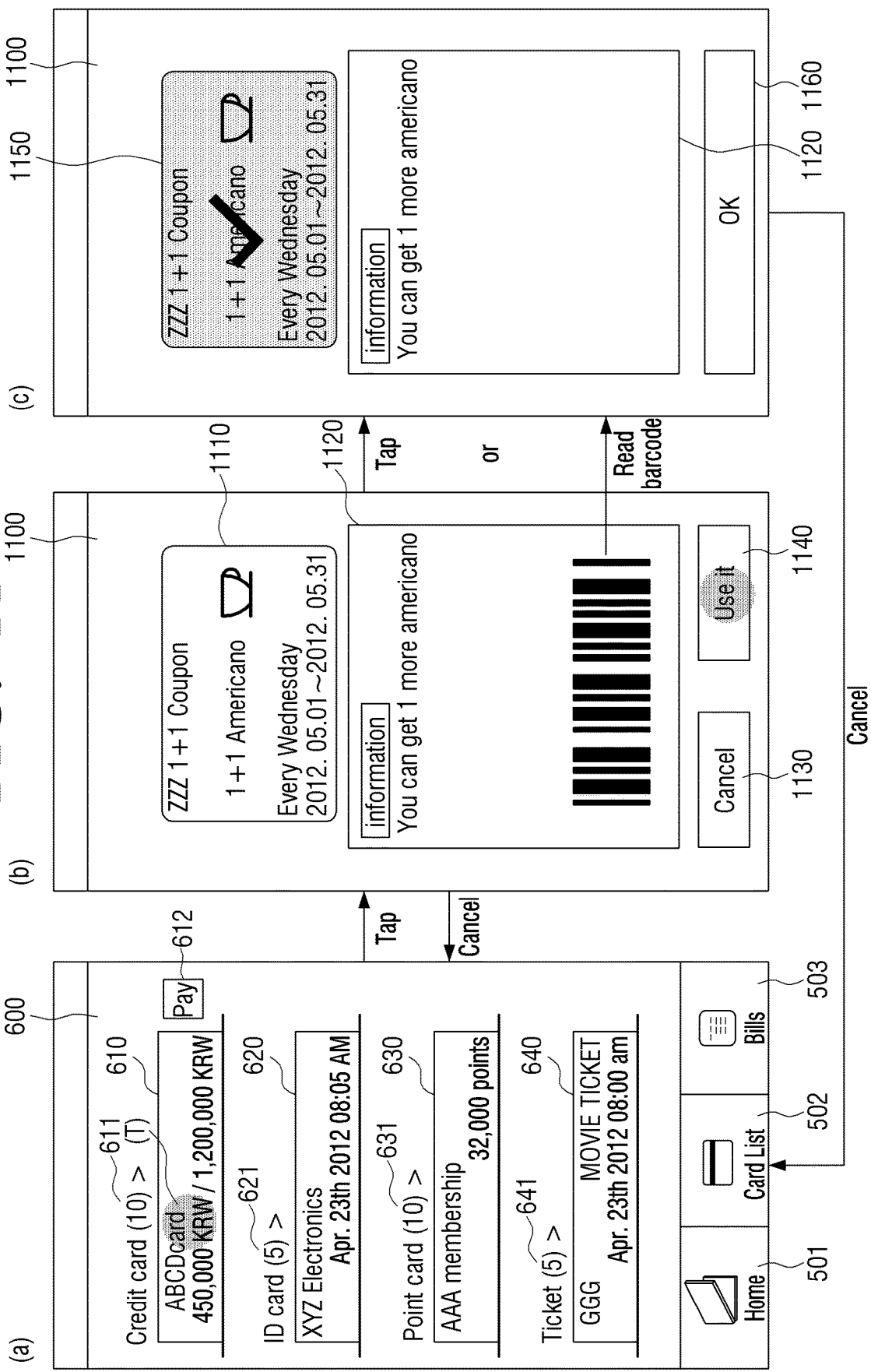
FIG. 11 is a view illustrating a screen specifically displaying a point card list.

FIG. 11 illustrates an example in which a point card is selected. When the point card information 630 is selected in 11000a, the controller 130 displays detailed information screen 1100 for a representative point card as illustrated in 1100b. A representative point card image 1110, detailed information 1120, selection menus 1130 and 1140, and the like are displayed in the detailed information screen 1100. When a use it menu 1140 of the selection menus is selected, the controller 130 applies benefits of the corresponding point card and performs a payment process. For example, when a free coupon or a discount coupon is used, the payment for an amount reduced by the amount stated in the coupon is progressed. 1100c illustrates an example that the point card is applied. When the use it menu is selected in the detailed information screen 1100, a mark 1150 indicating that the coupon has been used is displayed in the card image 1110 and a mark such as the bar code is deleted from the detailed information 1120 not to be used any longer. The selection menu is changed to an OK button 1160. When the user selects the OK button 1160 or when a preset period of time (for example, 5 seconds) is elapsed, the controller 130 displays the card list screen 600 as illustrated in 1100a again. When the representative point card has been used, a point card at a top among the unused point cards may be disposed in the point card information 630 of the card list screen 600.

Even when the ticket information 640 is selected, the payment is processed in a similar manner to the point card and thus illustration and description thereof will be omitted.

Various examples of selecting a payment option have been described. Hereinafter, various examples for a method of proceeding the payment will be described in more detail.

Figure 12:
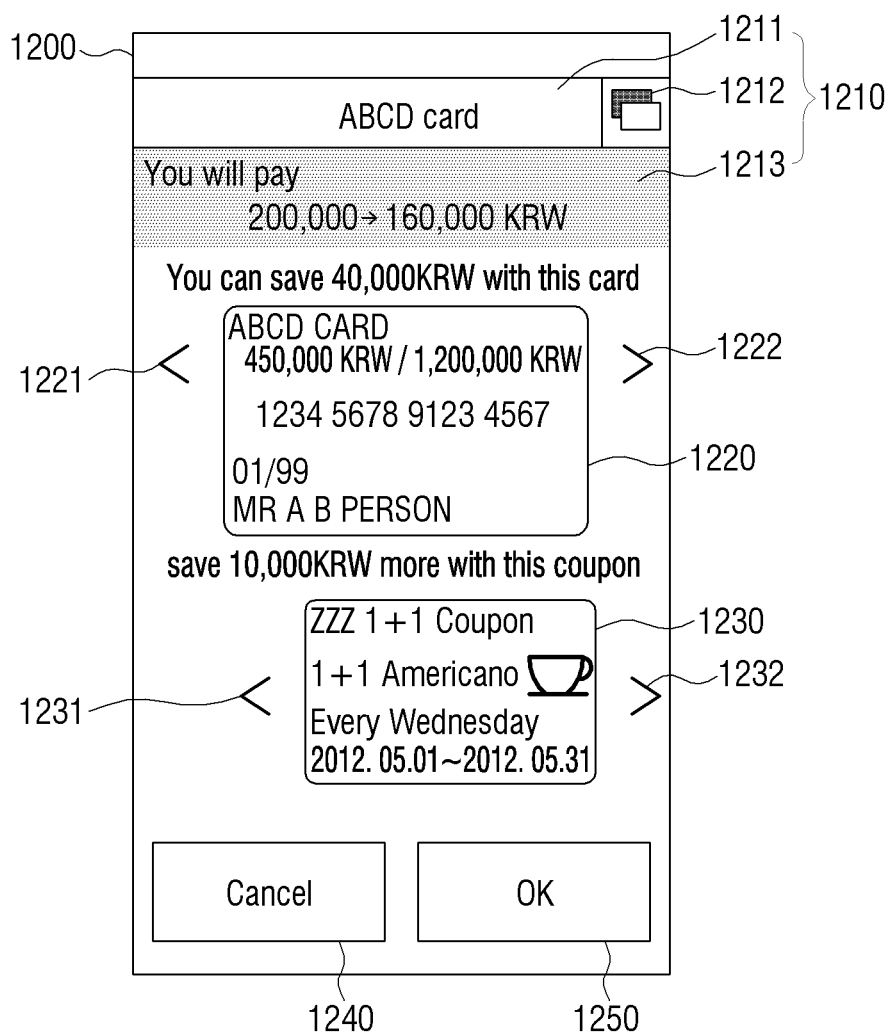
FIG. 12 is a view illustrating an example of a payment screen.

In the state in which the wallet application is automatically executed, the user performs tagging on a host apparatus such as a PoS terminal or access to the host apparatus in a wireless communication manner to proceed the payment. When information for an amount to be paid is transmitted from the PoS terminal by the tagging or wireless communication, the controller 130 executes the wallet application to immediately display a payment screen in which the payment amount is displayed. When the pay button in the screen as illustrated in FIG. 6 or 9 is selected, the controller 130 may display the payment screen together with the information for the selected credit card. FIG. 12 illustrates an example of the payment screen in which the payment amount is displayed.

Referring to FIG. 12, headline information 1210, various kinds of card information 1220 and 1230, selection menus 1240 and 1250, and the like may displayed in a payment screen 1200.

Information 1211 for the selected credit card, an icon 1212 for changing a card, information such as a requested payment amount 1213, and the like may be displayed in the headline information 1210. A credit card image 1220, a coupon image 1230, and the like may be included in the card information. The credit card image 1220 may be an image corresponding to the credit card displayed in the headline information 1210. Icons 1221, 1222, 1231, and 1232 for conversion into another card and the like may be displayed at both sides of each of the images 1220 and 1230.

A credit card, coupon, point card or the like initially displayed in the payment screen as illustrated in FIG. 12 may be automatically selected and recommended by the controller 130. That is, by considering a payment detail and a payment time of the user, a shop requesting the payment, an item to be paid, and the like, a card which may provide the greatest benefit, a card having the largest remaining credit limit, a card in which the user's preference is highest, or the like may be selected. The controller 130 may display the selected card at the top of the list as a representative card.

Even in the case of a coupon, the controller 130 may select and display the coupon in the similar manner to the above-described method. When a plurality of coupons are searched, the controller 130 may change the benefits of the coupons to amounts and recommend a coupon which provides the greatest benefit or recommend a coupon having the smallest remaining expiration data.

When the user selects an OK menu 1250 in the screen as illustrated in FIG. 12, the screen 1200 may be converted into an authorization screen for payment. The authorization screen may be implemented with a PIN input screen as illustrated in FIG. 8, but the authorization screen is not limited thereto. That is, various authorization screens may be provided according to setting of the user.

Figure 13:
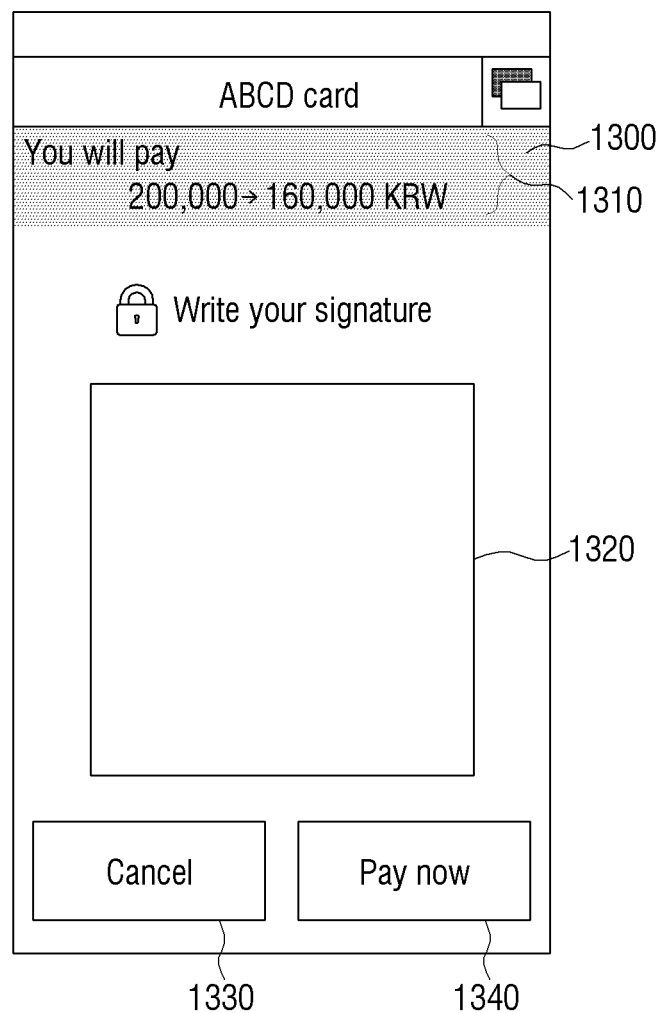
FIGS. 13 and 14 are views illustrating examples of payment authorization screens.
Figure 14:
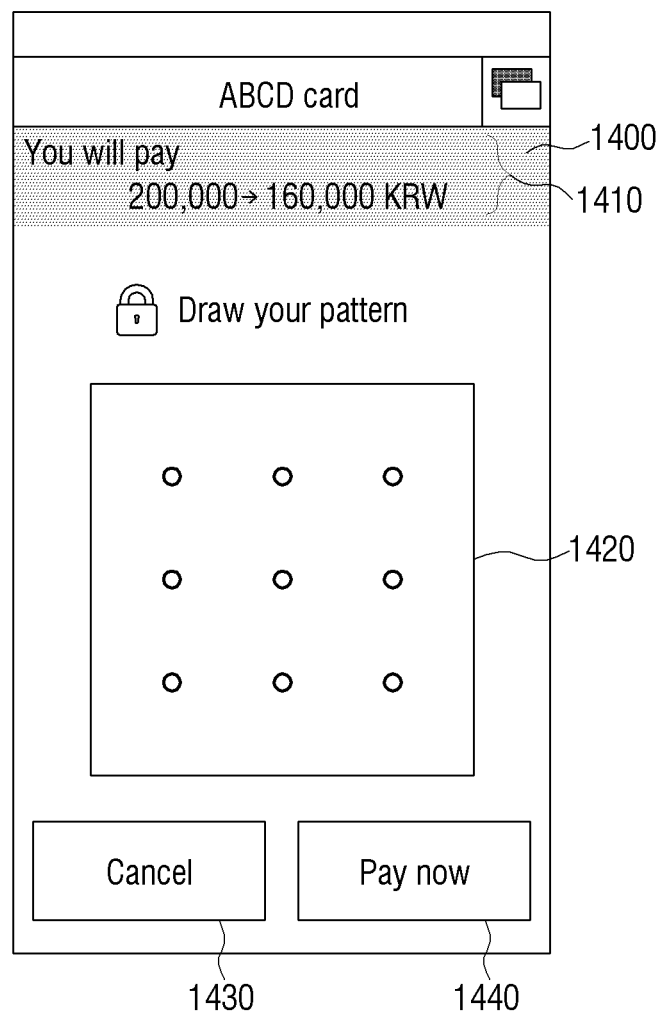

FIGS. 13 and 14 illustrate various examples of authorization screens.

Referring to FIG. 13, information 1310 for an amount to be paid, an input region 1320 to which the user's signature is input, selection menus 1330 and 1340, and the like may be displayed in an authorization screen 1300. When the user selects an encryption type as a signature in a setting screen, the authorization screen 1300 as illustrated in FIG. 13 may be provided.

FIG. 14 illustrates another example of an authorization screen. Referring to FIG. 14, information 1410 for an amount to be paid, a pattern input region 1420 to which the user inputs a pattern, selection menus 1430 and 1440, and the like may be displayed in an authorization screen 1400. When the user selects an encryption type as a pattern in the setting screen, the authorization screen 1400 as illustrated in FIG. 14 may be provided.

In addition, the wallet application may generate the screen using information for a transaction statement or an electronic receipt.

Figure 15:
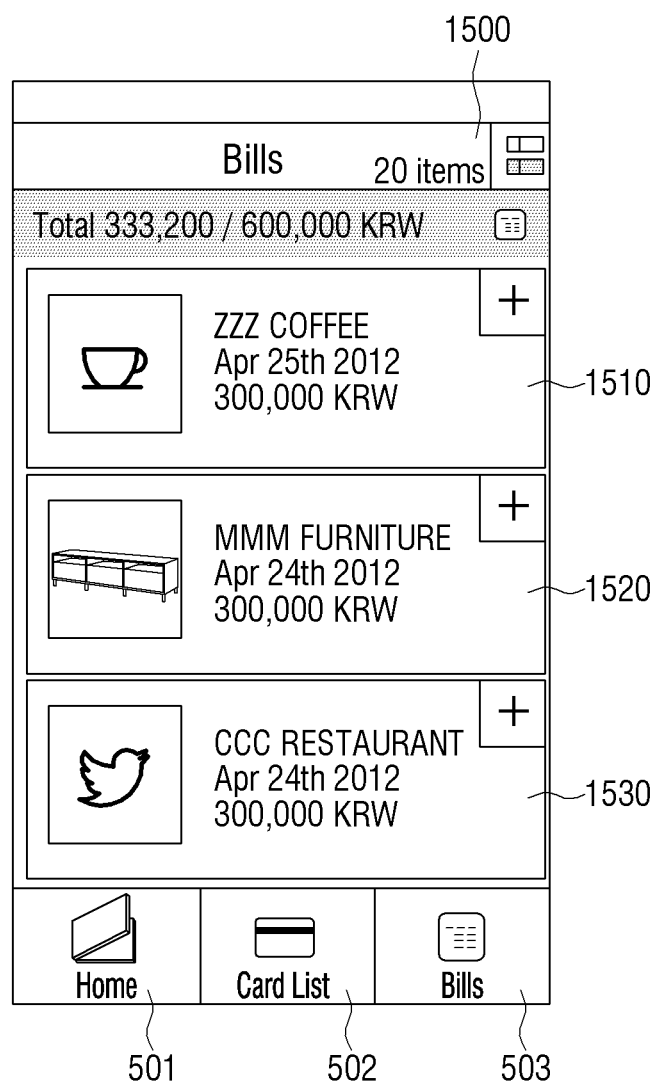
FIG. 15 is a view illustrating an example of a receipt list screen.

FIG. 15 illustrates an example of a list screen for an electronic receipt. Referring to FIG. 15, details 1510, 1520, and 1530 paid using an electronic application are arranged and displayed in a list form in a list screen 1500. The list screen as illustrated in FIG. 15 may be displayed when the bills menu 503 is selected in the payment home screen 500 as illustrated in FIG. 5 or other screens.

Figure 16:
FIG. 16 is a view illustrating an example of an electronic receipt.

FIG. 16 illustrates a screen when one electronic receipt is selected in an electronic receipt list screen. Referring to FIG. 16, when one electronic receipt is selected, a detailed information screen 1600 for the selected receipt is displayed. Specifically, a payment amount, a company name, a payment data, purchase detail, and selection menus 1610 and 1620 are displayed. Among the selection menus, a split menu 1610 is a menu for requesting payment exclusive charge or payment sharing to other users based on the payment amount and an OK menu 1620 is a menu for terminating the wallet application after the receipt is stored. In addition, a share menu for sharing the payment detail, a list menu for viewing a receipt list, and the like may be further displayed.

Figure 17:
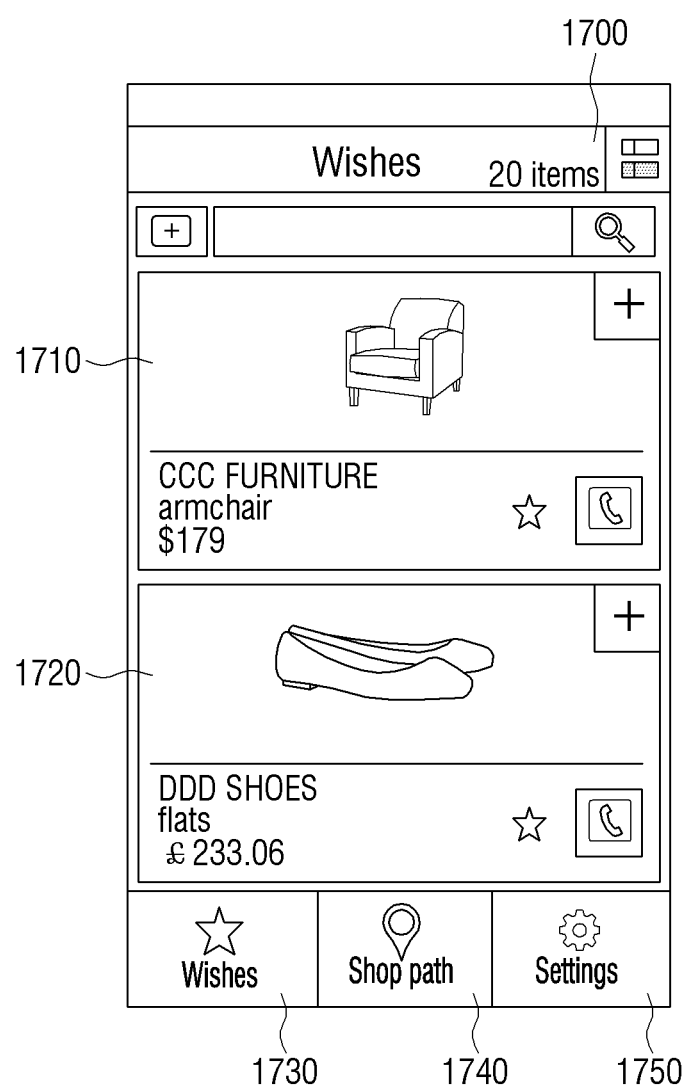
FIG. 17 is a view illustrating an example of a wish list.

FIG. 17 illustrates an example of a wish list generated by the user. The wallet application as illustrated in FIG. 3 may also manage information for the wish list. The wish list is a list in which the user has registered interested goods. Referring to FIG. 17, various selection menus 1730, 1740, and 1750 and the like are displayed in a wish list screen 1700 together with goods information 1710 and 1720 including images, names, and prices of goods. When one piece of goods information is selected in FIG. 17, the controller 130 may displays detailed information for the selected goods.

When the user selects a shopping path menu 1740 in the screen as illustrated in FIG. 17, the controller 130 displays a path guide screen 1800 configured to display locations of shops which sale the goods registered in the wish list on a map.

Figure 18:
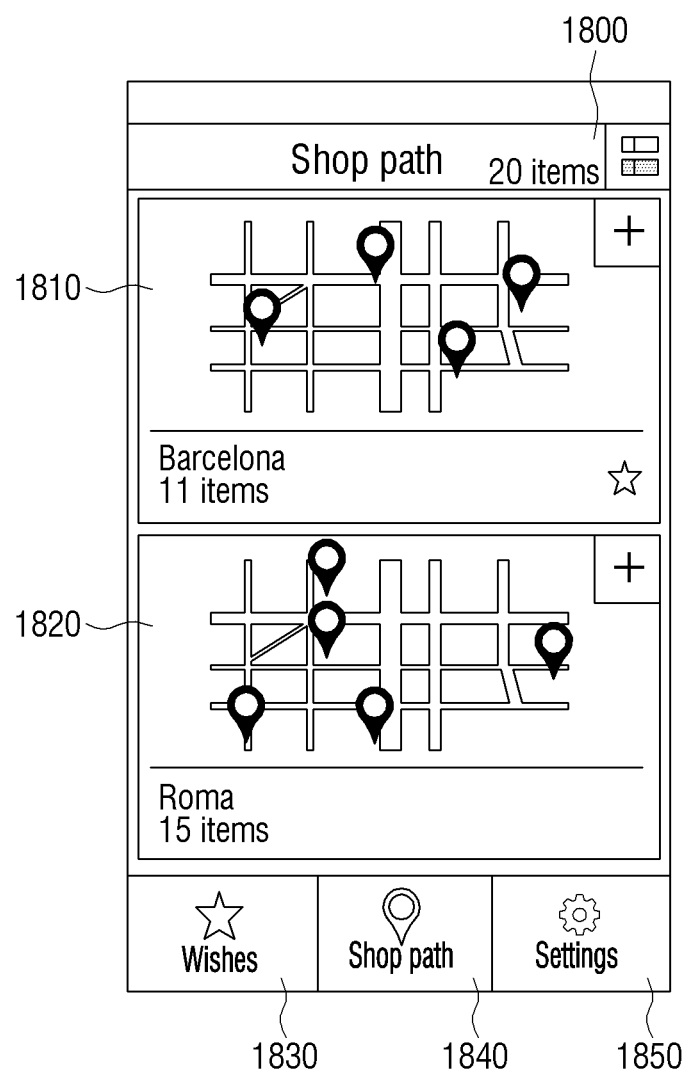
FIG. 18 is a view illustrating an example of a path guide screen.

FIG. 18 illustrates an example of the path guide screen 1800. FIG. 18 illustrates that two pieces of path guide information 1810 and 1820 for two goods are provided. When one of the two pieces of path guide information is selected, the selected information may be expanded and displayed.

Figure 19:
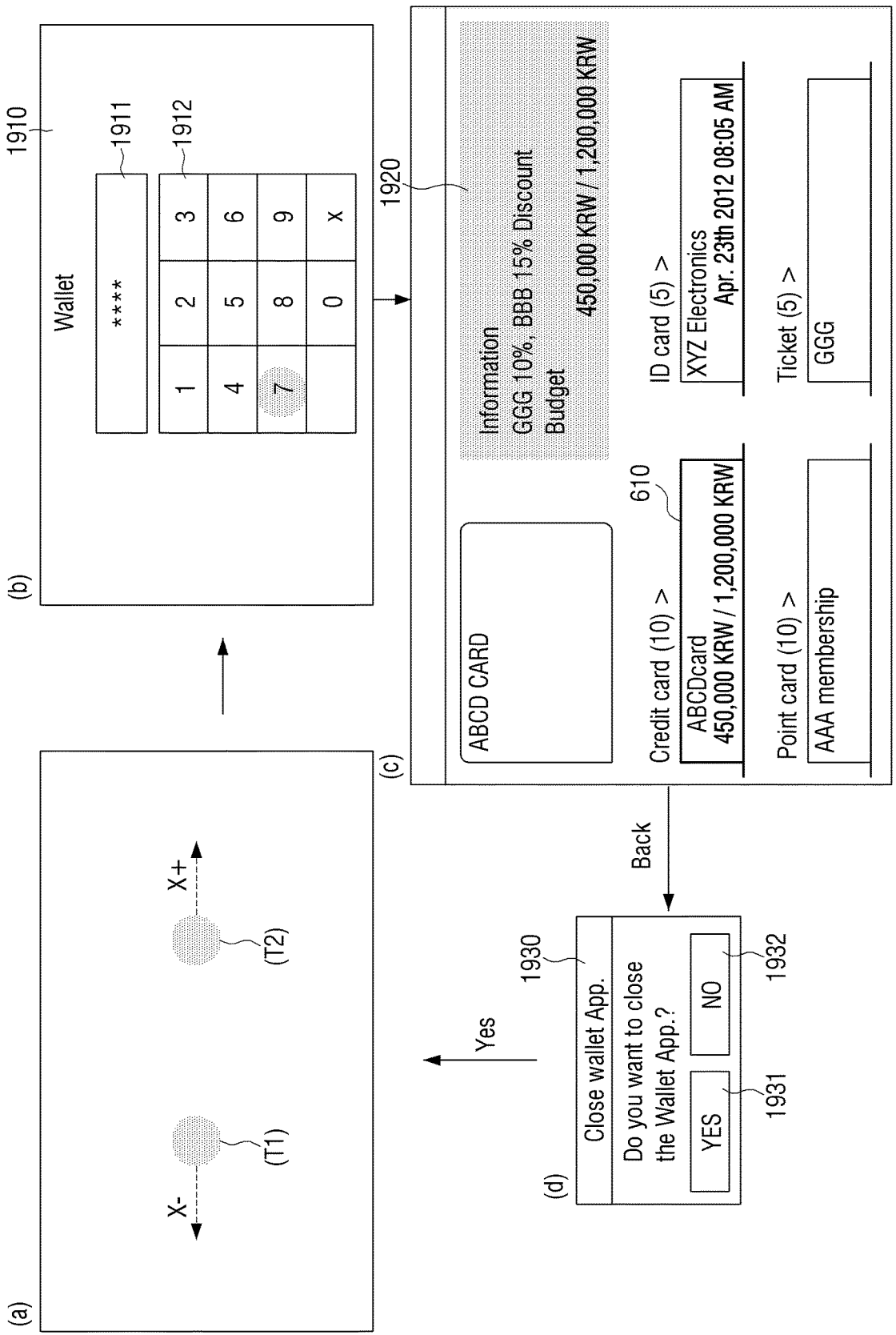
FIG. 19 is a view illustrating a process of executing a wallet application by a user' touch operation and displaying an execution screen of the wallet application.

As described above, the wallet application may provide various screens according to managing information. As in the exemplary embodiments described in FIGS. 1 and 2, when the wallet application is immediately executed by the user's gesture in a disabled state of the mobile device, an execution screen of the wallet application initially displayed may be one of the above-described various screens. That is, the payment home screen 500 may be initially displayed or the card list screen 600 may be initially displayed. Alternatively, the authorization screen for user authorization may be initially displayed. FIG. 19 is a view explaining a payment process when the authorization screen is first displayed.

Referring to 19000*a*, when a user operation in which the user touches two points T1 and T2 on a surface of the display unit 110 of the mobile device using two fingers and simultaneously moves two fingers outward from the touched points, that is, interaction is performed, an authorization screen 1910 as illustrated in 19000*b* is displayed. An input region 1911 and a key pad region 1912 may be displayed in the authorization screen 1910. When the user inputs a correct passcode, the controller 130 displays a card list screen 1920 as illustrated in 19000*c*. The card list screen 1920 illustrated in 19000*c* is the same as the screen of FIG. 7 and thus, repeated description thereof will be omitted. The user may perform tagging on the mobile device to a PoS terminal in a state in which the screen as illustrated in 19000*c* is displayed. In this case, the representative card information 610 may be provided to the PoS terminal by a NFC module provided in the communication unit 150. Therefore, the payment is done. On the other hand, when the user selects an application execution termination button or when the user does not perform payment for a certain period of time, a notification message 1930 as illustrated in 19000*d* may be displayed. The user may arbitrarily select menus 1931 and 1932 displayed in the notification message 1930 and select whether or not the wallet application is terminated. When the wallet application is terminated, the controller 130 converts the mobile device into a disabled state again. That is, the controller converts the mobile device into a lock state and causes the display unit 110 to be off.

Figure 20:
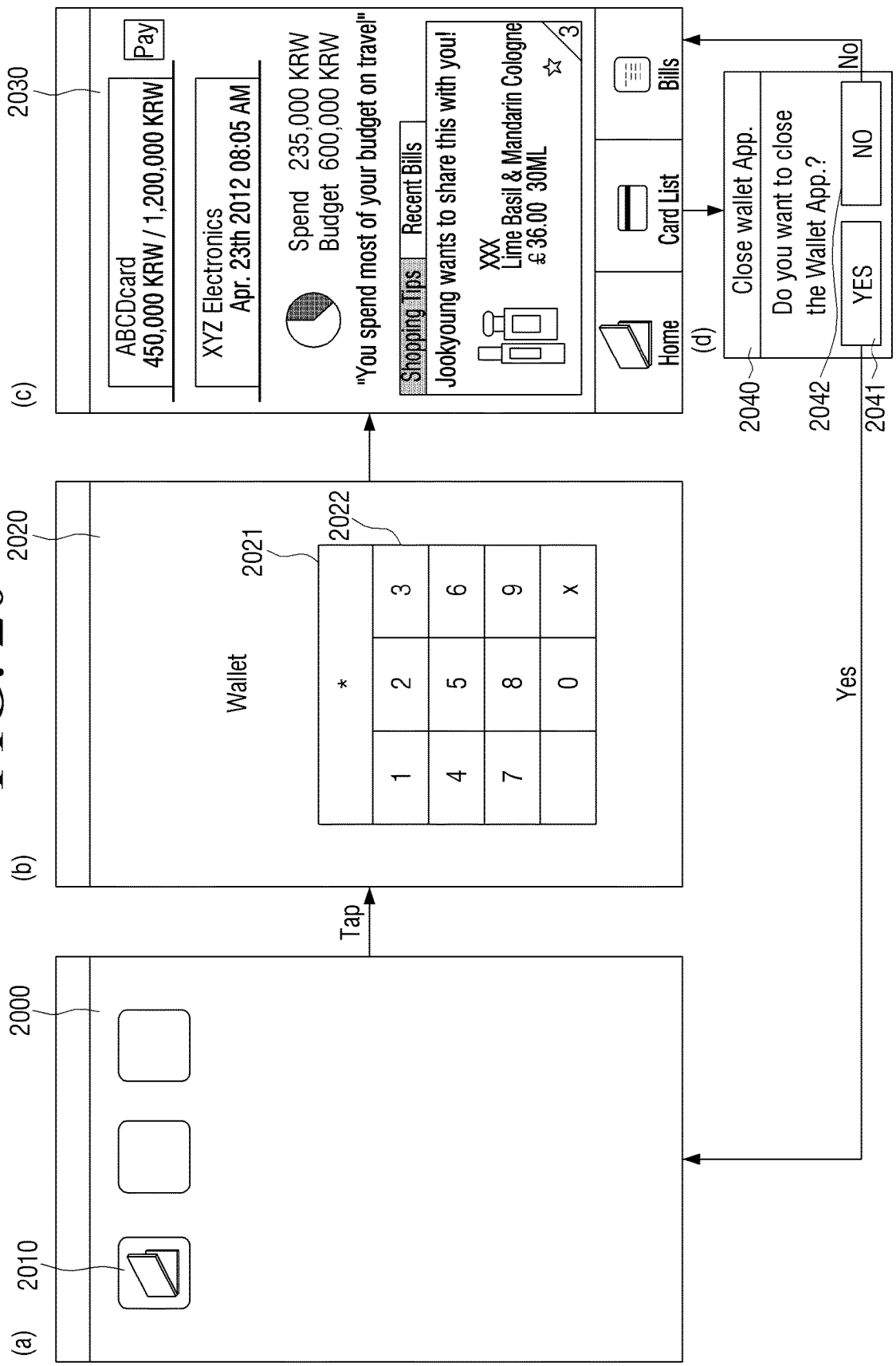
FIG. 20 is a view illustrating a process of executing a wallet application on a home screen by icon selection.

The wallet application has to be not executed in the disabled state by the user operation. That is, when an icon for the wallet application is selected in a main screen or an icon display screen of the mobile device, the wallet application may be executed. FIG. 20 illustrates an operation for this case.

As illustrated in 20000*a*, various icons may be displayed in a main screen 2000. When an icon 2010 corresponding to the wallet application among the icons is selected, an authorization screen 2020 is displayed as illustrated in 20000*b*. When the user inputs a passcode using an input region 2021 and a key pad 2022, a payment home screen 2030 is displayed as illustrated in 20000*c*. The payment home screen 2030 has been described in FIG. 5 and thus, repeated description thereof will be omitted. Like the example of FIG. 19, when the user select the application execution termination button in the payment home screen 2030 or when the user does not perform an operation for a certain period of time, a notification message 2040 as illustrated in 20000*d* may be displayed. Various selection menus 2041 and 2042 may be displayed in the notification message 2040. When the user selects a Yes menu 2041, execution of the wallet application is terminated and is restored to an original state as illustrated in 20000*a*. On the other hand, when the user selects a No menu 2042, the screen as illustrated in 20000*c* is maintained.

The user may arbitrarily set an option with respect to an operation of the wallet application.

FIG. 21 illustrates an example of a setting screen for setting an option of the wallet application. Referring to FIG. 21, a region 2110 for selecting a payment mode and a region for selecting an authorization method may be displayed in a setting screen 2100.

The payment mode may include an automatic mode 2111 and a manual mode 2112. The automatic mode 2111 may be a mode in which a payment is automatically performed without a credit card and the manual mode 2112 is a mode in which the credit card has to be selected before the payment. Further, there are a PIN code 2121, a signature 2122, a pattern input 2133, and the like as the authorization method. The user may select a desired option to use the wallet application. Data set by the user through the setting screen 2100 is stored in the storage unit 140. Therefore, the data may be used in the subsequent execution of the wallet application.

FIG. 22 is a flowchart specifically illustrating a payment method according to another exemplary embodiment. Referring to FIG. 22, the mobile device 100 may sense a user operation even in a screen off state of the display unit 110 or a locked state of the display state 110 (S2210). When the user operation is sensed, the mobile device determines whether or not the sensed user operation is a preset gesture (S2215). When it is determined that the sensed user operation is the preset gesture, the mobile device immediately activates the display unit and automatically executes the wallet application (S2220). Subsequently, the mobile device displays set card information in an execution screen of the wallet application (S2240).

On the other hand, when it is determined that the sensed user operation is not the preset gesture but an operation for performing an unlock operation (S2225), the mobile device performs an unlock operation (S2230) and displays a main screen. When a wallet application icon is selected in the main screen (S2235), the mobile device executes the wallet application (S2220) and display card information (S2240).

In this state, when the user performs tagging on an external apparatus (for example, a PoS terminal) (S2245), the mobile device determines whether or not a transaction amount is small (S2250). A determination criterion amount may be determined according to a financial policy. For example, when the criterion amount is 300 thousand won, an amount of below 300 thousand won may be determined as a small amount. When it is determined that the transaction amount is small, the mobile device immediately perform the payment and displays payment completion. That is, in the first tagging process, the mobile device may check the amount and immediately transmit payment information. The transmitted payment information may be card information displayed in the execution screen of the wallet application.

On the other hand, when it is determined that the transaction amount is not small, the mobile device displays a PIN input screen (S2255). Amount information acquired from the external apparatus in the tagging process may be also displayed in the displayed PIN input screen.

When the tagging operation is not performed in S2245 and a pay execution button is selected in the execution screen of the wallet application (S2260), a PIN input screen not including the payment amount is displayed (S2265).

When the PIN input is completed in the PIN input screen in S2255 or S2265 (S2270), the mobile device checks whether or not the input PIN is identical with preregistered information (S2275). When it is determined that the input PIN is identical with the preregistered information, a message which guides the user to perform tagging on the PoS terminal may be displayed (SS2285). Thus, when the user performs the tagging on the mobile device to the PoS (S2290), the payment is done and a payment completion message is displayed (S2295). When it is determined that the PIN information is not identical with the preset information in S2275, the PIN input screen is displayed again (S2280). At this time, the number of errors may be also displayed and when the PIN input is failed more than the predetermined number, the wallet application may be forcibly terminated.

Assuming that authorization is performed using the PIN and payment is performed in an NFC manner in FIG. 22, the payment method has been described. However, as described above, the authorization and payment method is not limited thereto.

FIG. 23 is a view explaining a process of performing payment through tagging with the PoS terminal. When the user input a predetermined gesture in the mobile device 100 and then performs tagging on a PoS terminal 200 to the mobile device 100 as illustrated in 23000a, an authorization screen 2310 is displayed as illustrated in 23000b. When the user input a PIN in the authorization screen 2310 and then selects a payment menu 2311, a screen 2330 which guides PoS contact is displayed as illustrated in FIG. 23000c. Information for a payment option, an image of the PoS terminal, a guide phrase, a payment amount, and the like may be displayed in the screen 2320.

Accordingly, tagging is performed again as illustrated in 23000d, the payment is done and an electronic receipt 2330 is issued and displayed as illustrated in 23000e. A payment amount, a company, and a payment detail, and the like may be displayed in the electronic receipt 2330 and a menu 2331 for requesting to split the amount to other users, an OK menu 2332, and the like may be displayed. When the OK menu is selected in FIG. 23000e or when a preset critical period of time is elapsed without input, the screen is restored to the screen before the Pos terminal contact.

FIG. 24 illustrates an example of an error message displayed when an incorrect passcode is entered. Referring to FIG. 24, an authorization cancel menu 2411, a retry menu 2412, or the like may be further displayed in an error message 2410 in addition to the number of incorrect input and a guide phrase. When the authorization cancel menu 2411 is selected, the payment process may be terminated.

FIG. 25 illustrates an example of a payment completion message displayed when the payment is completed. When the payment is completed, an electronic receipt as illustrated in 23000e may be displayed or a payment completion message 2500 as illustrated in FIG. 25 may be displayed. A payment relevant simple guide phrase may be displayed in the payment completion message 2500.

As described above, in the mobile device, the preset user operation is input and the wallet application is immediately executed and used. According to other exemplary embodiments, the user's fingerprint may be recognized to reinforce security of the wallet application.

FIG. 26 illustrates a configuration of a mobile device according to another exemplary embodiment. Referring to 26000a, a mobile device 100 may further include a fingerprint sensor 2600. The fingerprint sensor 2600 may sense a user's fingerprint.

The controller 130 determines whether or not the fingerprint sensed in the fingerprint sensor 2600 matches a user's preregistered fingerprint. Further, the controller 130 determines whether or not the user's touch operation performed together with the sensing of the fingerprint matches the preset gesture information. When it is determined that the user's touch operation matched with the gesture information and the user's fingerprint matched with the preregistered fingerprint information are sensed, the controller 130 immediately activates the display unit 110 and execute the wallet application.

26000b illustrates that a gesture, in which the user inputs his/her fingerprint in the fingerprint sensor 2600 and at this state, the user moves a finger 10 to a direction of the display unit 110 (that is, a Z direction), is input. The controller 130 determines that the user's predetermined operation is done when the touch is continuously done from a boundary of the display unit 110 above the fingerprint sensor 2600 to a fixed height within a certain period of time after the preregistered fingerprint is recognized. According to this, the controller 130 activates the display unit 110 and automatically executes the wallet application.

FIG. 27 illustrates another example of a mobile device including a fingerprint sensor. Referring to FIG. 27(a), a plurality of fingerprint units 2710 and 2720 are disposed at both sides of a display unit 110. Each of the fingerprint sensors 2710 and 2720 has a thin bar shape. Thus, when two fingers of the user pass through the fingerprint sensors 2710 and 2720, the fingerprint may be recognized.

27000b illustrates that a gesture, in which two fingers touches two points on a surface of the display unit 110 and then moves to an X− direction and an X+ direction respectively and passes through the fingerprint sensors 2710 and 2720, is input. The fingerprint sensors 2710 and 2720 sense the fingerprints when the user's fingers pass through the fingerprint sensors 2710 and 2720 and provide sensed fingerprints to the controller 130. The controller 130 compares the provided fingerprints and fingerprints stored in the storage unit 140. The controller 130 determines that an execution condition of the wallet application is satisfied when a touch trajectory sensed in the sensor 120 matches the preset gesture information and the fingerprints sensed in the fingerprint sensors 2710 and 2720 are matched with the registered fingerprints.

The fingerprint recognition may be performed through various methods. Specifically, as the fingerprint recognition method, there are a method using a semiconductor chip and a method using an optical unit.

The method using a semiconductor chip is a method of sensing a shape of a fingerprint using an electric conduction characteristic of a skin. That is, the method is a method of reading change in an amount of charges sensed by a sensor array and obtaining fingerprint information according to pressure of the fingers placed on a chip surface of a silicon chip and a heat image when fingertips come in direct contact with the surface of the silicon chip. The method using a semiconductor chip may be applied to the fingerprint sensors 2600 having the structure of FIG. 26.

The method using an optical unit is a method of emitting light, receiving the light reflected from a surface of a finger, and sensing characteristic of the finger surface.

FIG. 28 illustrates a fingerprint sensor implemented with the method using an optical unit. Referring to FIG. 28, the fingerprint sensor includes a glass plate 2810, a light source 2820, a lens 2830, and a light-receiving unit 2840.

The light source 2820 emits light to the glass plate 2810 and thus the light from a finger 10 placed on the glass plate 2810 is reflected. The reflected light is incident to the light-receiving unit 2840 through the lens 2830. The light-receiving unit 2840 may include an image sensor such as a charge coupled device (CCD). The finger image sensed in light-receiving unit 2840 may be analyzed and a fingerprint may be recognized. For clarity, FIG. 28 illustrates that the light source 2820 and the light-receiving unit 2840 are spaced apart from the glass plate 2810 to be tilted at a certain angle. However, a distance between the light source 2820 and the glass plate 2810 and between the light-receiving unit 2840 and the glass plate 2810 may be implemented to be close according to a thickness of the mobile device 100. Further, the light source 2820 and the light-receiving unit 2840 may be vertically disposed below the glass plate 2810 with respect to the glass plate 2810.

The number of fingerprint sensors and a size and arrangement location of the fingerprint sensor may be implemented in various structures other than structures illustrated in FIGS. 26 and 27.

FIG. 29 is a block diagram integrally explaining a configuration of a mobile device according to various exemplary embodiments. Referring to FIG. 29, a mobile device 100 includes a global positioning system (GPS) chip 161, a digital multimedia broadcasting (DMB) receiver 162, a motion sensor 163, an audio processor 164, a video processor 165, a speaker 166, a button 167, a capturing unit 168, and a microphone 169 in addition to a display unit 110, a sensor 120, a controller 130, a storage unit 140, and a communication unit 150.

The controller 130 may control an overall operation of a user terminal apparatus using a program stored in the storage unit 140. Specifically, the controller may sense a user operation done on a surface of the display unit 110. According to this, the controller may execute an application corresponding to the user operation. The wallet application may be matched with a specific gesture as in the above-described exemplary embodiments, but this is not limited thereto. For example, various applications such as a mail application or a call application may be matched in addition to the wallet application. Further, only one user gesture does not have to be set. For example, a plurality of user gestures may be set and the user gestures may be matched with applications different from each other.

The controller 130 may include a random access memory (RAM) 131, a read only memory (ROM), a min central processing unit (CPU) 133, a graphic processing unit (GPU) 134, a bus 135, and the like. The RAM 131, ROM 132, main CPU 133, GPU 134, and the like may be connected to each other through the bus 135. Various interfaces may be further included, but illustration and description thereof will be omitted.

The main CPU 133 access to the storage unit 140 and performs booting using operating system (OS) stored in the storage unit 140. A command set for system booting and the like may be stored in the ROM 132. When a turn-on command is input and power is supplied, the main CPU copies the OS stored in the storage unit 140 to the RAM 131 according to a command stored in the ROM 132 and executes the OS to boot the system. When the booting is completed, the main CPU 133 copies various types of programs stored in the storage unit 140 to the RAM 131 and executes the programs copied to the RAM 131 to perform various types of operations. When an application set to default exists, if the booting is completed, the main CPU 133 may automatically execute the programs. The main CPU 133 may monitor a sense signal output from the sensor 120 and determine whether or not a wallet application is executed. When it is determined that an execution condition of the wallet application is satisfied, the main CPU 133 loads the wallet application from the storage unit 140 to the RAM 131. The loaded wallet application controls respective components in the mobile device 100 and performs operations according to the above-described various exemplary embodiments.

The GPU 134 generates various types of screens. Specifically, the GPU may perform rendering on a wallet screen based on information for various types of payment options stored in the stored in the storage unit 140 when the wallet application is executed.

The communication unit is configured to perform communication with various kinds of external apparatuses according to various types of communication methods. The communication unit 150 includes a Wi-Fi chip 151, a Bluetooth chip 152, a near field communication (NFC) chip 153, a wireless communication chip 154, and the like.

Among the chips, the NFC chip 153 is a chip configured to perform NFC communication. The NFC is a non-contact short-range wireless communication method using a frequency bandwidth of 13.56 MHz. When NFC technology is used, if a plurality of terminals approach each other within a short range of about 10 cm, data may be transmitted and received. Tagging is performed to perform the short-range communication. The tagging is a behavior in which an apparatus including a NFC tag and any one of apparatuses including NFC readers approach each other toward the counterpart and located within a communicable range in which the NFC may be performed. The NFC chip 153 may include only NFC tag, but the NFC chip 153 may be implemented with one module in which the NFC tag and the NFC reader integrated.

The wireless communication chip 154 denotes a chip configured to perform communication according to various communication standards such as Institute of Electrical and Electronic Engineers (IEEE), Zigbee, third generation (3G), third generation partnership project (3RPP), and long term evolution (LTE). The communication unit 150 may include at least one among the above-described chips or chips according to other communication standards and perform communication with various external apparatuses using the chips.

The GPS chip 161 is configured to receive a GPS signal from a GPS satellite and calculate a current location of the mobile device 100.

The DMB receiver 162 is configured to receive and process a DMB signal.

The sensor 120 is configured to sense touch on a surface of the display unit 110. The controller 130 may compares a coordinate value of each object displayed in a displayed screen and a touch coordinate value of the sensor 120 and determines whether which object is selected.

The motion sensor 163 is configured to sense a motion such as a rotation state of the mobile device 100 using a gyro sensor, a geomagnetic sensor, an acceleration sensor, and the like. The controller 130 may perform various control operations according to a motion sensed by the motion sensor 163 in addition to a touch operation sensed by the sensor 120.

The audio processor 164 is configured to perform processing on audio data included in contents. Various processing such as decoding and amplification for the audio data or noise filtering may be performed in the audio processor 164.

The video processor 165 is configured to perform processing on video data included in the contents. Various processing such as decoding for the video data, scaling, noise filtering, frame rate conversion, and resolution conversion may be performed in the video processor 165.

The audio processor 164 and the video processor 165 may be driven when a program for reproducing contents received from an external source or the contents stored in the storage unit 140 is executed.

The display unit 110 may display an image frame generated in the video processor 165 as well as various screens on which the GPU 134 performed rendering. The speaker 166 output audio data generated in the audio processor 164.

The button 167 may be provided in a body of the mobile device 100 in various types such as a home button, a push button, a touch button, or a wheel button.

The capturing unit 168 is configured to perform a capturing operation. The controller 130 may select an image corresponding to an electronic receipt among images captured in the capturing unit 168, attach the image to the electronic receipt, and store the image-attached electronic receipt in the storage unit 140.

The microphone 169 is configured to receive user's voice or other sound and convert the user's voice or the sound into audio data. The controller 130 may use the user's voice input through the microphone 169 in a call process or converts the user's voice into audio data and stores a conversion result.

The above-described exemplary embodiments has described that the application is automatically executed only by the touch gesture on the surface of the display unit 110, but the application may be automatically performed by other types of user operations. For example, the controller 130 may immediately execute a matched application even through a motion gesture of a user recognized using the capturing unit 168 or speech input through the microphone 169.

FIG. 29 integrally illustrates mountable various components when the mobile device 100 integrally supports various functions such as a communication function, a DMB function, and a GPS reception function. Therefore, in some embodiments, a portion of the components illustrated in FIG. 29 may be omitted or changed or other components may be further added to the mobile device.

FIG. 30 illustrates an example of a software hierarchic structure of a mobile device. Referring to FIG. 3, the mobile device 100 may include various software such as an OS 141, a frame work 142, a call application 143, a wallet application 144, a browser 145, and a phone book application 146 as well as a hardware 3000.

The hard ware 300 denotes various types of hardware illustrated in FIG. 29. The OS 141 may control an overall operation of the hardware 3000 and mange functions of the hardware 3000. That is, the OS 141 is a hierarchy which is in charge of a basic function such as hardware management, memory, and security. The OS 141 may drive a display driver configured to drive the display unit 110, a communication driver configured to activate the communication unit 150 to transmit/receive signals, a camera driver configured to drive the capturing unit, an audio driver configured to drive the audio processor 164, modules of a power manager and the like to control the operation of the mobile device 100.

The frame work hierarchy 142 exists in an upper hierarchy of the OS 141. The framework hierarchy 142 performs functions for connecting respective application programs 143 to 146 of an application hierarchy to the OS hierarchy 141. For example, the frame work hierarchy 142 includes a location manager, a notification manager, a frame buffer configured to display an image to the display unit, and the like.

The application hierarchy configured to implement various functions exists in an upper hierarchy of the frame work hierarchy 142. The wallet application 144 exists in the application hierarchy. The wallet application 144 may provide various shopping services using various pieces of information as illustrated in FIG. 3.

Meanwhile, the aforementioned exemplary embodiments specifically describe an operation in a case in which a user's fingerprint matches a preregistered fingerprint, but the user's fingerprint may not match the preregistered fingerprint. For example, the user might have not registered his/her fingerprint on the mobile device after purchase of the mobile device, or might have allowed another user to use the mobile device 100. In this case, the user is not able to control the operations of the mobile device by using his/her fingerprint.

Hence, according to another exemplary embodiment, a method of enabling a user to easily register a fingerprint is provided.

FIG. 31 illustrates a configuration of a mobile device according to another exemplary embodiment. Referring to FIG. 31, the mobile device 100 includes a display unit 110, e.g. a display, a sensor 120, a controller 130, a storage unit 140, e.g. a storage, and a fingerprint sensor 2600. Among the descriptions related to the components in FIG. 31, the description overlapped with the descriptions in the aforementioned exemplary embodiments will be omitted.

The display unit 110 is a component configured to display various screens. The sensor 120 is a component configured to sense various types of user operations such as touch, touch and drag, flick, and the like to a surface of the display unit 110. As given above, the sensor 120 may be implemented as various types of sensors. In addition, as given above, the sensor 120 may sense a user operation even when the display unit 110 displays no image in the disabled state.

The fingerprint sensor 2600 is a component configured to sense a fingerprint of a user who inputs a user operation. As described above, there is no limit to the number or location of the fingerprint sensor 2600.

The storage unit 140 may store various fingerprint information which have been registered by a user.

When the fingerprint sensor 2600 senses a fingerprint, the controller 130 compares the sensed fingerprint with fingerprint information stored in the storage unit 140, and determines whether the sensed fingerprint matches the stored fingerprint information. When it is determined that the sensed fingerprint matches the stored fingerprint information, the controller 130 performs an operation corresponding to the user operation sensed by the sensor 120. For example, as explained in FIG. 26, by way of an example, when the user touches the fingerprint sensor 2600 with a finger and drags the finger according to a predetermined pattern to a direction of the display unit 110, the controller 130 executes a wallet application. According to this operation, a screen for an on-line shopping is displayed on the display unit 110 immediately.

When the sensed fingerprint does not match the stored fingerprint information, the controller 130 performs a fingerprint registration operation. The fingerprint registration operation refers to an operation of recognizing a new fingerprint of the user and storing the fingerprint in the storage unit 140.

When the sensed fingerprint does not match the stored fingerprint information, the controller 130 may display various messages guiding the user to register a fingerprint on the display unit 110. The user may register his/her fingerprint according to the message.

FIG. 32 shows an example of a process of performing the fingerprint registration operation according to an exemplary embodiment. Referring to FIG. 32, when the user touches a surface of the display unit 110 with a finger 10, drags the finger to a direction of the fingerprint sensor 2600, and touches the fingerprint sensor 2600, the controller 130 compares the sensed fingerprint with the stored fingerprint. When the sensed fingerprint does not match the stored fingerprint, the controller 130 displays a guide message 3200 informing that there is no registered fingerprint, an OK menu 3210 for starting the fingerprint registration operation, a cancellation menu 3220 for deleting the information message 3200 without performing the fingerprint registration operation, and the like. When the user selects the OK menu 3210, the controller 130 displays a hand-shaped guide image 3230 and a guide message 3240 guiding the user to input a fingerprint of a predetermined finger. The user touches the fingerprint sensor 2600 with the predetermined finger according to the guide image 3230 and the guide message 3240. The fingerprint sensor 2600 senses the user's fingerprint, and notifies the completion of sensing to the controller 130. Upon completion of sensing, the controller 130 stores information about the sensed fingerprint in the storage unit 140.

When the fingerprint registration is performed, the controller 130 displays another guide message 3260 informing that the fingerprint is registered, and a menu 3250 for finishing the fingerprint registration operation.

FIG. 32 illustrates a process of providing the guide message 3200 before actually performing the fingerprint registration operation, and inquiring the user's opinion, but such process may be omitted, and the guide image and the guide message may be displayed immediately according to an exemplary embodiment. In addition, FIG. 32 illustrates and describes that a fingerprint of a finger is registered, but the user may register the fingerprints of a plurality of fingers. At this point, after the fingerprint of a finger is registered, the controller 130 may display the guide message guiding the user to register a fingerprint of another finger so that the user may register the fingerprints of each of the other fingers sequentially.

Meanwhile, FIG. 32 describes an exemplary embodiment of immediately performing the fingerprint registration operation when the sensed fingerprint does not match the stored fingerprint, but it is possible to perform a user authorization before performing the fingerprint registration operation. That is, in order to prevent a third party other than the user or another user having permission from registering a fingerprint on the mobile device 100 without permission, the user authorization process may additionally be performed.

FIG. 33 is a view for illustrating an operation of a mobile device according to the exemplary embodiment. Referring to FIG. 33, when the user selects the OK menu 3210 while a message 3200 notifying a fingerprints mismatch state, the OK menu 3210, the cancellation menu 3220, and the like are displayed, an unlock pattern 3310 is displayed. The unlock pattern 3310 refers to a user interface which is composed of a plurality of objects, and releases a lock state when the user touches and drags each object according to a predetermined shape. FIG. 33 illustrates nine circular objects, but a shape or number of the objects is not limited thereto and is provided by way of an example only.

When the unlock pattern is displayed, the user should touch each object on the unlock pattern according to a predetermined direction and order. When a user operation that matches a predetermined pattern is performed, the controller 130 releases the lock state. In addition, the controller 130 may display the guide image 3240 for registering a fingerprint and the guide image 3260 immediately as described in FIG. 32, by way of an example.

FIG. 33 describes an exemplary embodiment of performing a user authorization by using the unlock pattern, but the user authorization may be performed by using various methods other than the unlock pattern. For example, the user authorization may be performed by using a user's I.D, a passcode, a resident registration number, and the like, or may be performed by using an authentication number received through a short message service (SMS), or an authentication certificate. In addition, the user authorization may be performed by photographing the user's face or recognizing the user's voice.

Meanwhile, the aforementioned several exemplary embodiments describe that an operation of executing the wallet application is performed when the user's fingerprint is recognized as being registered, but the operation which is performed when the fingerprint matches the stored fingerprint may be set differently by the user. In particular, when the user registers the fingerprints of a plurality of fingers, it is possible to match and register different functions with each finger. For example, a user operation is performed with an index finger of a right hand, the wallet application may be executed, and when the user operation is performed with a middle finger of the right hand, a mail program may be executed.

FIG. 34 is a view illustrating a process where the user registers the fingerprints of a plurality of fingers, according to an exemplary embodiment. Referring to FIG. 34, when the fingerprint registration operation is started, the controller 130 displays a guide image 3400 and a guide message 3410, respectively. The user touches the fingerprint sensor 2600 with a finger which is designated through the guide message 3410. The fingerprint sensor 2600 senses the fingerprint when it is touched with the finger.

When the fingerprint is sensed, the controller 130 stores information on the sensed fingerprint in the storage unit 140, and displays a guide message 3420 for selecting a function to be matched with the fingerprint information and an icon 3430 for each function on the display unit 110. FIG. 34 illustrates the icon 3430, a text for each function may be displayed in a form of a list instead of the icon.

When the user selects one icon 3430, the controller 130 matches and stores a function corresponding to the selected icon 3430 with the user's fingerprint information in the storage unit 140. Subsequently, the controller 130 displays a guide message 3440 for guiding the user to register a fingerprint of another finger on a side of the guide image 3400. In addition, the controller 130 may display a mark 3451 for notifying of the completion of the fingerprint registration of the registered finger. FIG. 34 illustrates the mark 3451 in a form of a box in a dotted line, but a shape and a display position of the mark 3451 may be modified in various ways. In addition, the controller 130 may display information about a function which has been selected by the user so as to match the finger on a side of the mark 3451.

The controller 130 may repeat the aforementioned process until the fingerprint registration of the entire hand i.e., all fingers, is completed or the user inputs a command for finishing the fingerprint registration operation. FIG. 34 illustrates a state in which the fingerprint registration of the entire hand is completed according to an exemplary embodiment.

The controller 130 displays the marks 3451 to 3455 for each finger on the guide image 3400, and displays various menus 3471, 3472, 3473, and 3474 on a side of the guide image 3400.

The controller 130 may perform additional fingerprint registration, change of the registered fingerprint, cancellation of registration, completion of registration, and the like according to a user's selection of menus 3471, 3472, 3473, and 3474. When the registration is completed, the controller 130 stores all of the registered fingerprint information and function information that matches each fingerprint information in the storage unit 140.

Meanwhile, if the user authorization process has been performed before the fingerprint registration, the controller 130 may store authorization information together with the entire fingerprint information and function information.

Subsequently, when the user performs a user operation by using a finger among ten fingers, the controller 130 executes a function corresponding to function information that matches the finger. That is, if the finger is a finger with which the wallet application is matched, the controller 130 displays an execution screen of the wallet application, and if the finger is a finger with which a mail program is matched, the controller 130 displays a mail screen. Or, when a volume-up function or a volume-down function other than the applications is matched with the finger, the controller 130 performs an operation of turning up or turning down the volume depending upon the number of touches or time duration of a touch performed by the finger. Hence, the user may enter into a state that the user wishes to use by using one of the user's several fingers even in the disabled state of the mobile device 100.

FIG. 35 is a flow chart for describing a method of controlling a mobile device according to another exemplary embodiment. Referring to FIG. 35, when a user operation is sensed (S3510), the mobile device senses a fingerprint of a user who performed the user operation (S3520). As described above, the user's fingerprint may be sensed by various types of fingerprint sensors. FIG. 28 illustrates an example of the fingerprint sensor, but the fingerprint sensor may be implemented as a form of flat surface on a lower side of the surface of the display unit 110, and may sense a fingerprint by using a method of scanning a touched surface the moment a user touches the surface of the display unit 110.

When the fingerprint is sensed, the mobile device determines whether the sensed fingerprint matches the registered fingerprint information (S3530). When it is determined that the sensed fingerprint matches the registered fingerprint information, the mobile device performs an operation corresponding to the user operation, as described above (S3540).

When the sensed fingerprint does not match the registered fingerprint information, the mobile device performs the fingerprint registration operation (S3550). The example of the operation corresponding to the user operation and the detailed order of the fingerprint registration operation have been described above, and thus the overlapped description will be omitted.

FIG. 36 is a flow chart for describing a method of registering a fingerprint in detail. Referring to FIG. 36, when the sensed fingerprint does indicating that the fingerprint does not match the registered fingerprint. That is, the mobile device displays an error message notifying of a mismatch state (S3610).

When the user wishes to register a fingerprint in this state (S3620), the mobile device displays a guide message for registering a fingerprint (S3630). The guide message may further include the guide image.

When a fingerprint is sensed (S3640), and a function to be matched with the sensed finger is selected (S3650), the mobile device matches and stores the fingerprint information with function information (S3660). By contrast, when a certain time elapses while a fingerprint is not sensed, the mobile device determines whether to finish the fingerprint registration operation (S3680). To be specific, the mobile device displays a user interface (UI) inquiring whether to finish the fingerprint registration operation, and when the user inputs a finish command in response to the UI or performs no operation, finishes the fingerprint registration operation. If the fingerprint registration operation is not finished, the mobile device again displays the guide message (S3630).

When fingerprint information and function information for a finger are stored, the mobile device inquires of the user as to whether the user wishes to register a fingerprint of another finger (S3670), and when the user decides to do so, the mobile device displays the guide message guiding the user to register a fingerprint of a finger to be registered again (S3630).

According to such processes, the user may register the fingerprints of fingers that the user wishes to register, and may register a function corresponding to the fingerprints selectively.

According to the above-described exemplary embodiments, services may be conveniently and easily used by using a user terminal apparatus. In particular, the payment may be rapidly performed using the wallet application. In exemplary embodiments, the application is called the wallet application, but the name of the application performing the above-described operation may vary. Further, the exemplary embodiments have described that the payment application is automatically executed by a user gesture in a disabled state of the display unit, but this is not limited thereto. That is, even in an activate state of the mobile device 100, when the predetermined user gesture is input, the payment application may be executed.

In addition, the aforementioned various exemplary embodiments have been explained based on the mobile device, which are not limited to the mobile device only in implementation. For example, the various exemplary embodiments may be implemented in various user terminal apparatuses used on a fixed position, such as a TV, a PC, a kiosk, and the like.

The above-described methods according to the exemplary embodiments may be implemented with a program which is performed through various computer devices and then recorded in various non-transitory computer-readable media.

Specifically, the non-transitory computer-recordable medium, in which the program which provides various services by sequentially performing sensing a user operation with respect to the display unit, sensing a fingerprint of a user who inputs the user operation, performing an operation corresponding to the user operation when the sensed fingerprint matches the preregistered fingerprint information, and performing a fingerprint registration operation when the sensed fingerprint does not match the preregistered fingerprint information is recorded, may be mounted on various user terminal apparatuses including the mobile device.

The non-transitory computer-recordable medium, in which a program which implements the methods of providing service according to the above-described exemplary embodiments is recorded, may be mounted on a host apparatus or a server.

The non-transitory computer-recordable medium may be connected to or mounted on the above-described various types of mobile devices and support to execute the methods in the corresponding devices.

The non-transitory computer-recordable medium is not a medium configured to temporarily store data such as a register, a cache, a memory, and the like but an apparatus-readable medium configured to semi-permanently store data. Specifically, the above-described applications or programs may be stored and provided in the non-transitory computer-recordable medium such as a compact disc (CD), a digital versatile disc (DVD), a hard disc (HD), a blu-ray disc, a USB, a memory card, a read only memory (ROM), and the like.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A mobile device comprising:
a display;
a communication interface;
a sensor;
a fingerprint sensor capable of sensing touch done on a surface of the display;
a storage storing fingerprint information and gesture information; and
a controller configured to:
receive a user's touch sensed by the sensor and a fingerprint sensed by the fingerprint sensor on the surface of the display, wherein the display is in a disabled state prior to the touch of the user,
compare the user's touch with the stored gesture information and the fingerprint with the stored fingerprint information,
in response to the user's touch matching the stored gesture information and the fingerprint matching the stored fingerprint information, release the disabled state of the display, automatically execute a wallet application corresponding to the user's touch without further input from the user, control the display to display an execution screen with respect to the wallet application without further input from the user, and based on a received selection of making a payment in the executed wallet application, control the communication interface to transmit information for making the payment to an external apparatus, and
in response to the fingerprint not matching the stored fingerprint information, control the display to display on a single screen both a message indicating that the sensed fingerprint does not match the stored fingerprint information and a user interface for receiving a selection, among selectable options, to start a fingerprint registration operation,
wherein, based on an input for selecting to start the fingerprint registration operation being received through the sensor, the controller is configured to:
perform an authentication regarding an authorization for the fingerprint registration operation based on a user input,
based on the authentication being successful, control the display to display a user interface for receiving another fingerprint,
in response to sensing that the another fingerprint is received, through the fingerprint sensor, control the display to display a plurality of objects respectively representing a plurality of functions which are executable by the mobile device, and
in response to sensing a selection input for selecting an object of a function from among the plurality of objects of the plurality of functions executable by the mobile device, store in the storage the function as a function corresponding to the another fingerprint.

2. The mobile device as claimed in claim 1, wherein the storage further stores information about a plurality of functions executed by the mobile device matched with a plurality of fingerprint information registered for respective fingers, and
wherein, in response to sensing a fingerprint matching at least one of the plurality of fingerprint information registered, through the fingerprint sensor, the controller is configured to execute a function matching the sensed fingerprint from among the plurality of functions matched with the plurality of fingerprint information registered for the respective fingers.

3. The mobile device as claimed in claim 2, wherein the plurality of functions comprises a function of the wallet application which relates to managing personal finances executed by the mobile device.

4. The mobile device as claimed in claim 1, wherein the controller is configured to:
in response to the fingerprint sensed by the fingerprint sensor not matching the stored fingerprint information, control the display to display a hand-shaped guide image on the display and to display a guide message guiding to input a fingerprint of a respective finger displayed in the hand-shaped guide image, and
in response to the fingerprint of the respective finger being sensed by the fingerprint sensor, match and store the sensed fingerprint with information about a user stored in the storage.

5. The mobile device as claimed in claim 1, wherein the controller is configured to receive, through the sensor, a user operation comprising the user's touch on the surface of the display in the disabled state of the display.

6. The mobile device as claimed in claim 5, wherein, the controller is further configured to identify whether the user operation matches a preset gesture, and in response to the user operation matching the preset gesture, execute the wallet application activated, and control the display to display the execution screen of the wallet application.

7. The mobile device as claimed in claim 1, wherein the controller is further configured to, based on the authentication being successful, control the display to output another message.

8. The device as claimed in claim 1, wherein, the controller is further configured to display a confirm menu for starting the fingerprint registration operation and a cancellation menu for deleting a guide message without performing the fingerprint registration operation.

9. A method of controlling a mobile device comprising:
receiving a user's first touch sensed by a sensor and a first fingerprint sensed by a fingerprint sensor capable of sensing touch done on a surface of a display, wherein the display of the mobile device is in a disabled state prior to the first touch of the user;

comparing the user's first touch with stored gesture information and the first fingerprint with stored fingerprint information;
in response to the user's first touch matching the stored gesture information and the first fingerprint matching the stored fingerprint information releasing the disabled state of the display, automatically executing a wallet application corresponding to the user's first touch without further input from the user and controlling the display to display an execution screen with respect to the wallet application without further input from the user;
based on a received selection of making a payment in the executed wallet application, transmitting information for making the payment to an external apparatus;
receiving a second touch sensed by the sensor and a second fingerprint sensed by the fingerprint sensor, wherein the display of the mobile device is in the disabled state prior to the second touch;
comparing the second touch with stored gesture information and the second fingerprint with stored fingerprint information;
based on the sensed second fingerprint not matching the stored fingerprint information, displaying, on a single screen of the display of the mobile device, both a message indicating that the second fingerprint does not match the stored fingerprint information and a user interface for receiving a selection, among selectable options, to start a fingerprint registration operation; and
based on an input for selecting to start the fingerprint registration operation being received, following operations are performed:
performing an authentication regarding an authorization for the fingerprint registration operation based on a user input;
based on the authentication being successful, displaying a user interface for receiving another fingerprint,
in response to sensing that the another fingerprint is received, control the display to display a plurality of objects respectively representing a plurality of functions which are executable by the mobile device, and
in response to sensing a selection input for selecting an object of a function from among the plurality of objects of plurality of functions executable by the mobile device, storing the function as a function corresponding to the another fingerprint.

10. The method as claimed in claim 9, further comprising:
registering a plurality of fingerprints for respective fingers;
storing function information matching with each of the plurality of fingerprints;
sensing a user operation with respect to the display of the mobile device;
sensing a fingerprint corresponding to the sensed user operation;
identifying whether an execution of an application corresponding to the user operation on the mobile device can be performed based on comparing the sensed fingerprint corresponding to the sensed user operation with the plurality of fingerprints for the respective fingers; and
executing the application corresponding to the user operation based on the identifying that the operation can be performed.

11. The method as claimed in claim 9, wherein the fingerprint registration operation further comprises:
displaying a hand-shaped guide image on the display and a guide message guiding the user to input a fingerprint of a respective finger shown on the hand-shaped guide image.

12. The method as claimed in claim 11, wherein for each registered finger on the hand-shaped guide image a corresponding mark is displayed, which indicates whether a corresponding fingerprint is registered and information on the selected function corresponding to the registered fingerprint on the hand-shaped guide image and wherein the message further comprises a plurality of menus on a side of the hand-shaped guide image.

13. The method as claimed in claim 9, further comprising:
sensing a user operation with respect to the display;
identifying whether the user operation matches a preset gesture; and
in response to the user operation matching the preset gesture, and the sensed fingerprint matching the stored fingerprint information, executing the wallet application activated, and displaying the execution screen of the wallet application.

14. The method as claimed in claim 9,
wherein the performing the authentication comprises, in response to receiving, an input requesting to register the another fingerprint, authenticating, by the mobile device, a user by methods other than the fingerprint, and
wherein the method further comprising, in response to the authentication being successful, displaying on the display of the mobile device another message requesting an input of the another fingerprint of the user.

15. The method as claimed in claim 9, further comprising displaying an unlock pattern process prior to the performing the fingerprint registration operation.

16. The method as claimed in claim 15, wherein the unlock pattern process comprises:
displaying an unlock pattern when the mobile device is in a lock state;
receiving user input comprising a pattern of selecting at least two objects in the displayed unlock pattern;
matching the input pattern with a predetermined stored pattern; and
performing the fingerprint registration operation based on the input pattern matching the predetermined stored pattern.

17. The method as claimed in claim 9, wherein the fingerprint registration operation further comprises:
outputting on the display of the mobile device another message indicating that the operation cannot be performed and requesting the input of the another fingerprint; and
in response to receiving the input of the another fingerprint, outputting on the display of the mobile device another message.

18. The method as claimed in claim 9, further comprising displaying a confirm menu for starting the fingerprint registration operation and a cancellation menu for deleting a guide message without performing the fingerprint registration operation.

* * * * *